(12) United States Patent
Simanavicius et al.

(10) Patent No.: US 11,621,902 B2
(45) Date of Patent: Apr. 4, 2023

(54) SYSTEM, METHOD, UTILITY, AND GOVERNANCE FOR DISTRIBUTED DATA ROUTING OVER THE INTERNET

(71) Applicant: Syntropy Network Limited, Palo Alto, CA (US)

(72) Inventors: Jonas Simanavicius, Vilnius (LT); Domas Povilauskas, Vilnius (LT); Vytautas Jurenas, Vilnius (LT)

(73) Assignee: Syntropy Network Limited, Palo Alto, CA (US)

( * ) Notice: Subject to any disclaimer, the term of this patent is extended or adjusted under 35 U.S.C. 154(b) by 199 days.

(21) Appl. No.: 17/321,608

(22) Filed: May 17, 2021

(65) Prior Publication Data
US 2022/0345385 A1    Oct. 27, 2022

Related U.S. Application Data

(60) Provisional application No. 63/179,230, filed on Apr. 24, 2021.

(51) Int. Cl.
| | | |
|---|---|---|
| *H04L 12/50* | (2006.01) | |
| *H04L 29/08* | (2006.01) | |
| *H04L 12/725* | (2013.01) | |
| *H04L 43/087* | (2022.01) | |
| *H04L 41/50* | (2022.01) | |
| *H04L 43/0852* | (2022.01) | |
| *H04L 43/0829* | (2022.01) | |
| *H04L 45/121* | (2022.01) | |

(52) U.S. Cl.
CPC ........ *H04L 43/087* (2013.01); *H04L 41/5029* (2013.01); *H04L 43/0829* (2013.01); *H04L 43/0858* (2013.01); *H04L 45/121* (2013.01)

(58) Field of Classification Search
CPC ... H04L 45/121; H04L 41/5029; H04L 45/70; H04L 12/00; H04L 45/12; H04L 43/0829; H04L 43/0835; H04L 45/3065; H04L 43/0841; H04L 43/0858; H04L 43/087; H04L 43/0876; H04L 43/0882; G04Q 20/02; G04F 21/57; G16H 40/63; G16H 40/67
USPC ......................................................... 370/232
See application file for complete search history.

(56) References Cited

U.S. PATENT DOCUMENTS

2014/0177460 A1* 6/2014 Keskkula ................ H04L 45/70
370/252
2020/0322262 A1* 10/2020 Maino ...................... H04L 67/04
(Continued)

*Primary Examiner* — Edan Orgad
*Assistant Examiner* — Vanneilian Lalchinthang
(74) *Attorney, Agent, or Firm* — SV Patent Service

(57) ABSTRACT

A method is disclosed for distributed routing data with latencies using relay nodes. The method includes automatically measuring one-way latencies between a plurality of nodes comprising a first node, a second node, and a relay node, producing a first signal associated with a proof of uptime for the relay node, producing a second signal associated with a proof of bandwidth for the relay node, after the proof of uptime and the proof of bandwidth of the relay node are validated, automatically identifying a relayed data routing path from the first node to the second node via the relay node based on the one-way latencies between the plurality of nodes, in response to a command to transfer data from the first node to the second node, and transferring data from the first node to the second node along the relayed data routing path.

19 Claims, 22 Drawing Sheets

(56) References Cited

U.S. PATENT DOCUMENTS

2021/0314820 A1\* 10/2021 Schliwa-Bertling ........................ H04L 47/762
2022/0028538 A1\* 1/2022 Auerbach .............. G16H 40/20

\* cited by examiner

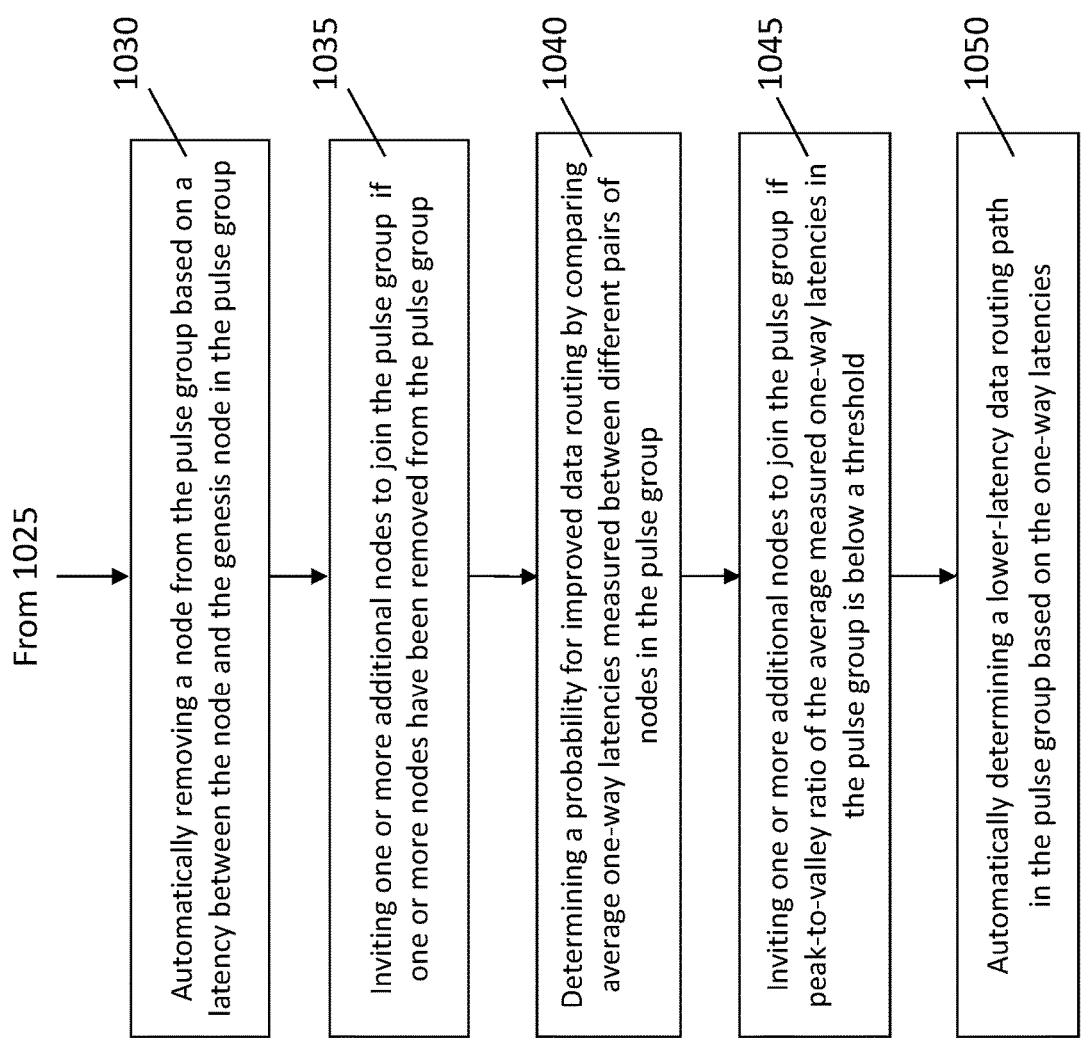

|  | To A | To B | To C | To D | To E |
|---|---|---|---|---|---|
| From A |  |  |  | 51 |  |
| From B |  |  |  | 53 |  |
| From C | 50 |  |  | 100 | 91 |
| From D |  |  | 85 |  |  |
| From E |  |  |  | 25 |  |

SYSTEM, METHOD, UTILITY, AND GOVERNANCE FOR DISTRIBUTED DATA ROUTING OVER THE INTERNET

FIELD OF THE INVENTION

The present invention relates generally to the field of computer network, and in particular, to improving performance of data communications over computer networks such as the Internet.

BACKGROUND OF THE INVENTION

The current Internet transit services are vulnerable to eavesdropping, and fail to route around partially degraded networks, leading to suboptimal network performance.

Conventional technologies in the dynamically routed internet field primarily operate at the Network Layer (Layer 3) by selecting a best path for traffic based on the shortest path between the data sending node and the destination node. The conventional technologies also do not take into account of the network degradation condition. Related technologies in the Virtual Private Networking (VPN) provide protection from eavesdropping, but do not route around degraded network paths.

There is therefore a need for computer network technologies with improved transmission speed, more security, and higher reliability (less data loss, less jitters, etc.).

SUMMARY OF THE INVENTION

The present disclosure provides the implementation of a thin layer of software over the Internet, which can transform the public Internet into a computer network having the best data transport.

In one general aspect, a method for distributed routing data with latencies using relay nodes that includes automatically measuring one-way latencies between a plurality of nodes comprising a first node, a second node, and a relay node, producing a first signal associated with a proof of uptime for the relay node, producing a second signal associated with a proof of bandwidth for the relay node, after the proof of uptime and the proof of bandwidth of the relay node are validated, automatically identifying a relayed data routing path from the first node to the second node via the relay node based on the one-way latencies between the plurality of nodes, in response to a command to transfer data from the first node to the second node, and transferring data from the first node to the second node along the relayed data routing path.

Implementations of the method may include one or more of the following. The method can further include sending a first relay payment from the first node to an escrow for data routing fees, and sending a reward from the escrow to the relay node based on a completion of transferring data from the first node to the second node along the relayed data routing path. The method can include sending a second relay payment from the first node to a reward pool, and sending an uptime reward from the reward pool to the relay node if the proof of uptime for the relay node is validated. The method can further include validating the proof of uptime of the relay node by one or more validator nodes. The method can further include receiving a first validation payment by the one or more validator nodes for validating the proof of uptime of the relay node. The method can further include validating the proof of bandwidth of the relay node by one or more validator nodes. The method can further include receiving a second validation payment by the one or more validator nodes for validating the proof of bandwidth of the relay node. The step of automatically identifying a relayed data routing path can be based on a total one-way latency of the relayed data routing path and at least one of criteria that include: an uptime of each of the nodes forming the relayed data routing path, a median jitter of each routing segment in the relayed data routing path, a median bandwidth of each routing segment in the relayed data routing path, an average packet-loss of each routing segment in the relayed data routing path, or amount of data routed in both directions by each routing segment in the relayed data routing path. A total one-way latency of the relayed path is lower than a one-way latency associated with a direct path from the first node to the second node. The step of automatically measuring one-way latencies between a plurality of nodes can include automatically sending a plurality of pulse messages from the first node to other nodes in the plurality of node, receiving one of the plurality of pulse messages by the relay node, wherein the one of the plurality of pulse messages includes a first timestamp associated with sending time by the first node, wherein the one of the plurality of pulse messages is received at a reception time associated with a second time stamp, and automatically computing a first one-way latency from the first node to the relay node based on the first time stamp and the second time stamp. The step of automatically measuring one-way latencies between a plurality of nodes can include automatically sending a plurality of pulse messages from nodes to the second node, receiving one of the plurality of pulse messages from the relay node by the second node, wherein the one of the plurality of pulse messages includes a third timestamp associated with sending time by the relay node, wherein the one of the plurality of pulse messages is received at a reception time associated with a fourth time stamp, and automatically computing a second one-way latency from the relay node to the second node based on the third time stamp and the fourth time stamp, wherein a total one-way latency for the relayed data routing path can be characterized by a sum of the first one-way latency and the second one-way latency. The total one-way latency can be smaller than a one-way latency measured in a direct path from the first node to the second node.

In another general aspect, the present invention relates to a non-transitory computer-readable medium storing a plurality of instructions which, when executed by one or more processors, cause the one or more processors to perform operations a computer network, the operations comprising: automatically measuring one-way latencies between a plurality of nodes comprising a first node, a second node, and a relay node, producing a first signal associated with a proof of uptime for the relay node, producing a second signal associated with a proof of bandwidth for the relay node, after the proof of uptime and the proof of bandwidth of the relay node are validated, automatically identifying a relayed data routing path from the first node to the second node via the relay node based on the one-way latencies between the plurality of nodes, in response to a command to transfer data from the first node to the second node, and transferring data from the first node to the second node along the relayed data routing path.

In another general aspect, the present invention relates to a computer system for autonomously selecting low-latency data routing paths across the Internet, which includes a server configured to send instructions to a plurality of nodes in a computer network, and a memory storing the instructions that, when executed by the one or more processors at the plurality of nodes, cause the plurality of nodes to automatically measure one-way latencies between a plurality of nodes comprising a first node, a second node, and a relay node, produce a first signal associated with a proof of uptime for the relay node, producing a second signal associated with a proof of bandwidth for the relay node, after the proof of uptime and the proof of bandwidth of the relay node are validated, automatically identify a relayed data routing path from the first node to the second node via the relay node based on the one-way latencies between the plurality of nodes, in response to a command to transfer data from the first node to the second node, and transfer data from the first node to the second node along the relayed data routing path.

The present disclosure describes a collection of distributed computer systems connected over an Internet that acts as a single autonomous cryptographically-secured overlay relay network. A collection of control and pulse messages exchanged between computers can dynamically form optimal groupings of the computers called pulse groups. One-way packet latencies are continually measured between the nodes within a pulse group in a public Internet or a private Internet. The continual measurements create a distributed full-mesh one-way latency matrix that is shared with all the nodes in the pulse group.

The disclosed systems, non-transitory computer-readable medium, and methods identify where a better performing encrypted network path exists through an intermediary relay node based on the distributed full-mesh one-way latency matrix. Public cryptographic keys are propagated across potential relay nodes and endpoints. The end systems can bypass their network providers' direct route to route their communications via a better performing encrypted application-layer path. The better performing network path via one or more relay nodes has lower latency, loss, jitters, etc. than the direct path between the end systems.

In some aspects, nodes are invited to join a pulse group by a genesis node based on the need of the pulse group and the values of the perspective node can bring to a pulse group. In another aspect, the stability of the nodes as well as potential for the nodes to provide better routing are evaluated, which allows some nodes to be removed and some nodes to be added, thereby maintaining the quality performance for the pulse group. Furthermore, the nodes can be selected or removed based on the degree of proximity of these nodes relative to the genesis nodes.

Machine learning and heuristics can be used to dynamically form a node group (i.e. pulse group) to accommodate fluctuations in offered network load. One-way packet latencies are autonomously and continually measured in both directions between each pair of nodes within a pulse group.

One advantage of the disclosed systems, non-transitory computer-readable medium, and methods is that their operations can measure and find the faster paths between Internet-connected computer devices without the requirement of clock synchronization between the computer devices.

Another advantage of the disclosed systems and methods is that more secure communications can be provided by "spraying" data traffic across similar latency paths to increase the difficulty of capturing encrypted traffic for off-line analysis.

By managing the population of pulse groups, the disclosed systems and methods provide a buffer to the overall network load. Whenever or wherever a computer network is overburdened with traffic and experiencing high latencies, the disclosed systems and methods can autonomously identify alternative routing path and alleviate the traffic latency or congestion, which result in more consistent and reliable in the network's performance.

Moreover, the disclosed systems and methods can provide a more reliable data communications over a network. An end-system experiencing high packet loss can spray the same packet continuously across available paths, to maximize the chance of one of the packets make it through to the destination of the data communication.

Furthermore, a simple directory service can facilitate the establishment and validation of secure end-to-end network connections in a global computer network.

The better performing alternative paths can pass through one or more relay nodes between the initiation (or source) node and the destination node of a data transmission. Yet another advantage of the disclosed systems and methods is that mechanisms are established to encourage nodes to participate in serving as the relay nodes to provide the alternative routing paths for data transmissions. An incentive system can be set up for the relay nodes to be compensated for their participating services. The nodes that transmitted data can make a payment to the relay nodes used in the data transmission. The payment can be recorded in a secure and transparent method. Moreover, premium data transmission services can be provided by nodes connected to a high-speed data gateway.

In another aspect, the presently disclosed method and system provide a global directory that helps participating nodes in need of data exchanges to connect to each other. A new pulse group can be autonomously formed to enable determination of low-latency routing paths between the two nodes over the Internet.

BRIEF DESCRIPTION OF THE DRAWINGS

FIG. 2A shows an exemplified one-way latency (OWL) matrix that includes measured OWL values from each pair of nodes in a pulse group and illustrates the selection of better performing data routing paths in accordance with some embodiments of the present invention.

DETAILED DESCRIPTION OF THE INVENTION

To overcome the problems faced by the conventional network routing technologies, the present invention provides a decentralized system that continually measures latencies in the computer network and dynamically determines better performing paths between nodes in the computer network based on the up-to-date measured latencies.

Figure 1A:
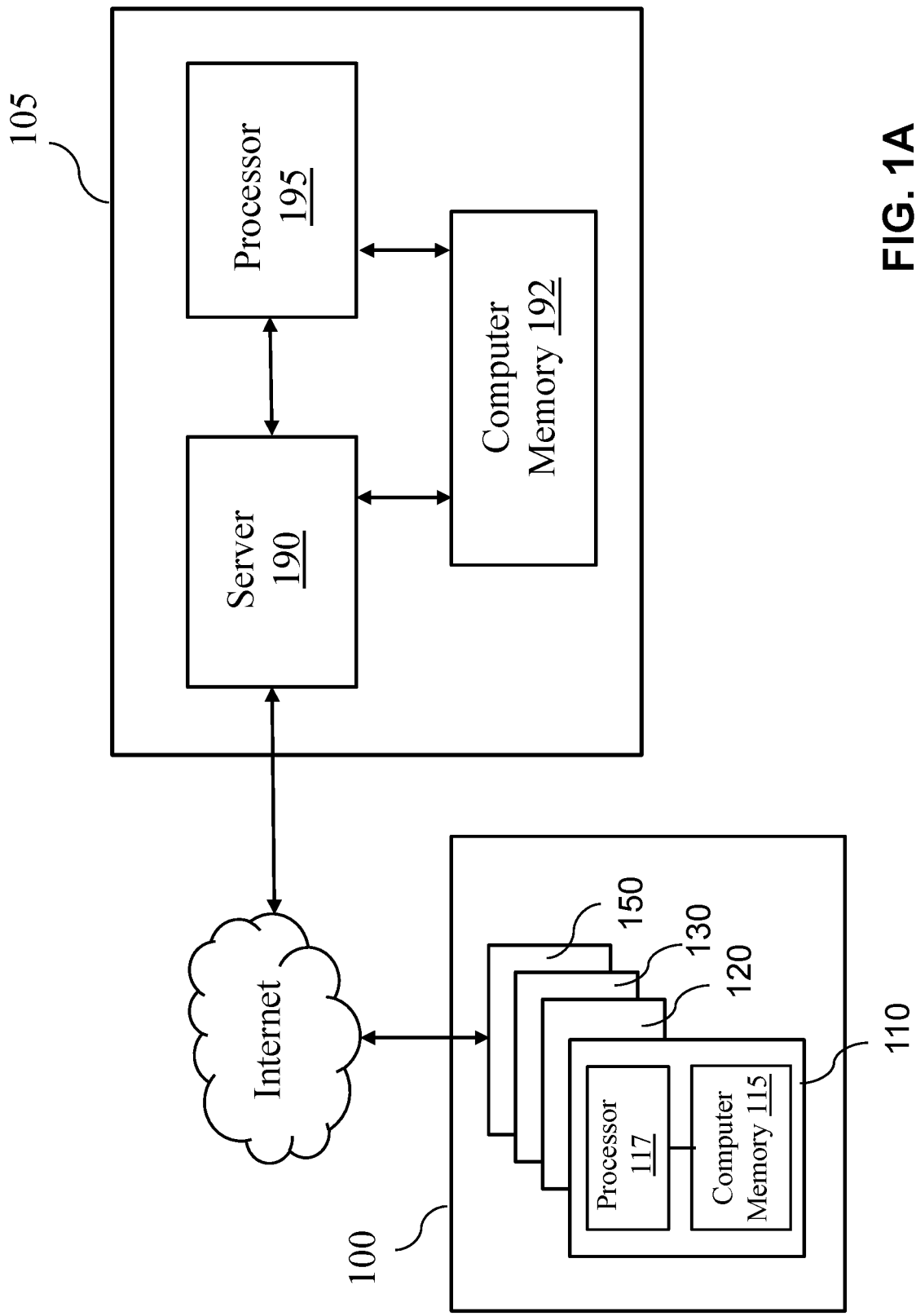
FIG. 1A shows a protocol-instruction provider computer system that provides codes for the autonomous formation and the autonomous operations of pulse groups in a computer network in accordance with some embodiments of the present invention.
Figure 1B:
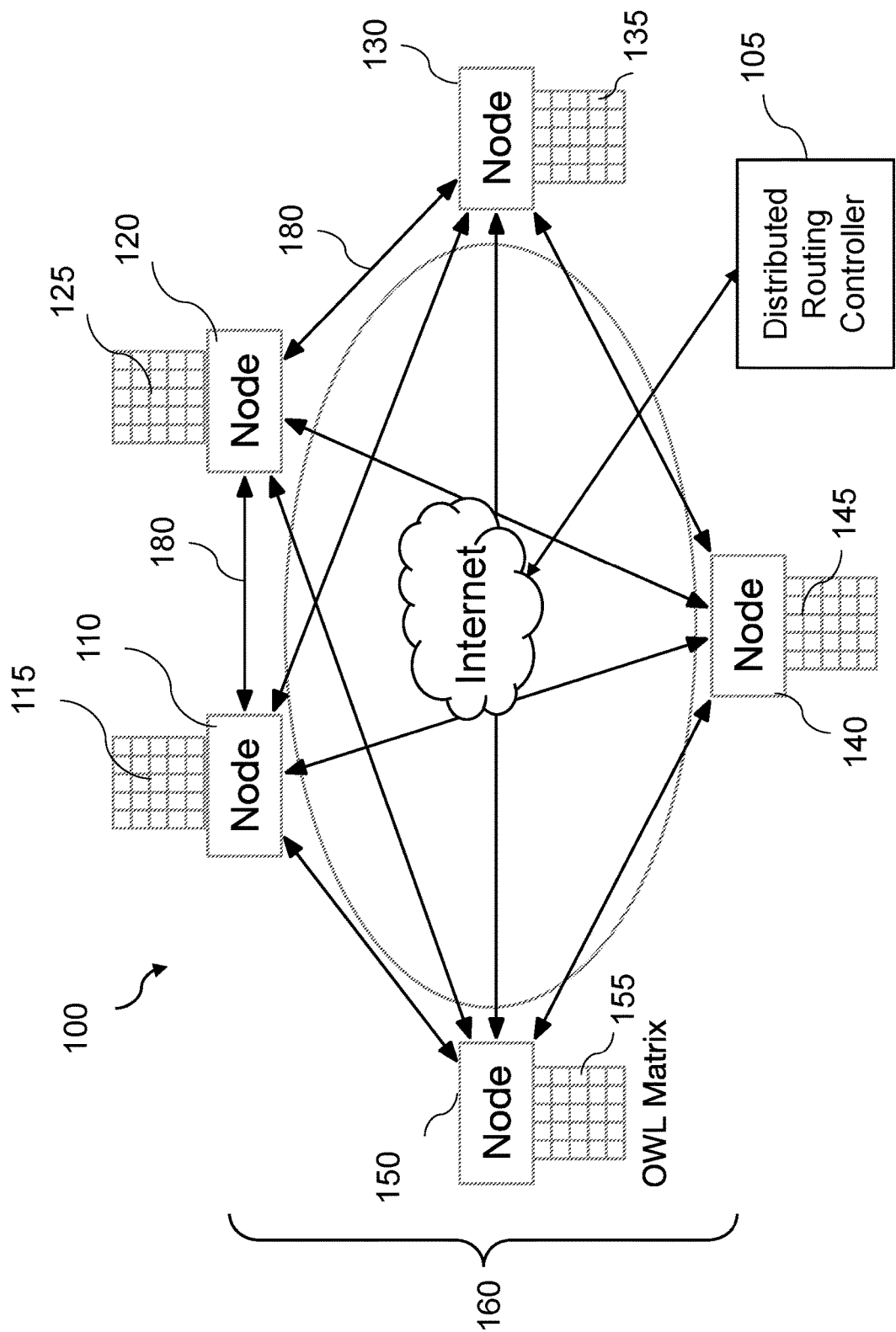
FIG. 1B illustrates connections and latency measurements between computer nodes in a pulse group in accordance with some embodiments of the present invention.

In some embodiments, referring to FIGS. 1A and 1B, a distributed routing controller 105 includes a server 190, a computer memory 192, and a processor 195, in connection with a computer network 100 via the Internet. The computer network 100 includes a collective of interconnected computers or nodes 110-150. The distributed routing controller 105 can distribute and provide protocol instructions to other computer devices or computer nodes. The computer memory 192 stores computer codes that include instructions that define a distributed autonomous routing protocol (DARP), which enable nodes in the computer network 100 to form a group for continual measurements of data-transmission latencies and for determining better performing data routing pathways among a group nodes such as nodes 110-150.

The nodes 110-150 can receive the above described computer codes that contain the distributed autonomous routing instructions via download from the distributed routing controller 105. The node 110 can include a computer memory 115 that stores the computer codes and a processor 117 that executes the computer codes and implement instructions under the distributed autonomous routing protocol. Once the computer codes are installed on the respective computers, the nodes 110-150 are formed into a pulse group 160 according to the distributed autonomous routing protocol, which establishes secure communications among the nodes 110-150 in the pulse group 160.

The distributed routing controller 105 can be operated by a private service provider that originally develops the distributed autonomous routing protocol. In some embodiments, the computer codes can be implemented as dockers that are installed at each of the node computers within a pulse group. The dockers enable compartmentalization of the node computers, which allows the instructions for the distributed autonomous routing protocol to be executed without interfering with other operations of the node computers. The distributed routing controller 105 can be responsible for managing and updating versions of the dockers. To ensure proper operations, all the nodes 110-150 execute the instructions for the distributed autonomous routing protocol by running the same version of the computer codes. In some embodiments, the above described computer codes are distributed and updated using encrypted software.

The distributed routing controller 105 can also be implemented within a file repository system that is private or open to the public. In one implementation, the file repository system can be a public file repository; the original computer codes are provided by an entity that develops or establishes the distributed autonomous routing protocol. A portion of the computer codes can be contributed by many users or agents in the form of open source. Publically contributed codes can help the expansion and applications of pulse groups and the accomplishing faster and more reliable network routing. The distributed routing controller 105 can further include a commercial service provider that facilitates formation and/or maintenance of the pulse groups, and identification of better performing routing paths between nodes.

Details about the formation, verification, and maintaining members of a pulse group are now described. The following described steps can be automatically executed by the computer nodes installed with the computer codes carrying DARP instructions as described in FIGS. 1A and 1B. In some embodiments, referring to FIGS. 1C-1E, a first computer node (such as node A, node B, node C, node P, or node Q) is connected to the Internet and has downloaded or received computer codes (such as a docker) containing DARP instructions from a distributed routing controller (105 in FIGS. 1A and 1B) (step 1000). Aside from instructions for executing tasks for fulfilling distributed routing, the computer codes are also pre-installed with a list of public genesis nodes (e.g. G1, G2, G3 . . . ) across the global Internet and associated identification information of the public genesis nodes (step 1000). The identification information of the public genesis nodes can include IP addresses, a public key, or a DNS name. These public genesis nodes serve as the gateways for the first node to join the community of DARP-enabled computer nodes to provide and to benefit from distributed routing across the Internet. This community includes a plurality of genesis nodes, pulse groups, and a global directory that can connect all the DARP participating nodes together.

Under the instructions of DARP, the node (e.g. node A) installed with DARP computer codes automatically sends one or more ping messages 1050 to the IP addresses of one or more genesis nodes in the pre-installed list of public genesis nodes (step 1005) in attempt to establish contact with global DARP community and/or to join a pulse group to perform various roles in a pulse group (e.g. a user for improved data routing path, a relay node, a validator, or even a genesis node, etc.). For example, node A sends ping messages 1050, 1060 respectively to a genesis node G1 and a genesis node G2. The node C sends ping messages 1050, 1070 respectively to a genesis node G1 and a genesis node G3.

A ping message can include the public key or the IP address of a genesis node (e.g. G1, G2, G3 . . . ) and a request for response from the receiving genesis node. The ping message can also specify DARP software version installed on the sending node (A, B, C, P, Q . . . ). In some embodiments, the nodes that send the ping messages are not new to the DARP community, they have participated in pulse groups and performed relay functions (i.e. acting as relay nodes for data routing paths). A ping message can specify the number of relays that the sending node has provided for routing data in any pulse groups under DARP. Detailed description about routing data by relay nodes are below in relation to FIGS. 2A, 9, 11-13, etc. In some embodiments, the ping messages can specify that the number of pulse groups that the sending node is currently participating. The number of relays provided and the number of pulse group participated by the node (e.g. A, B, C, P, Q . . . ) can provide, to the receiving genesis nodes, an indication about the value and credentials of the node.

In some embodiments, the ping messages can be based on UDP (User Datagram Protocol), which can include the specific public port of the replying node. The public port to which the perspective node is connected can be another criterion for a genesis node selecting a node to join a pulse group.

In some embodiments, the ping messages can be formed by single data packages which minimize the amount of overhead to the network and increase reliability of the responses.

The genesis node G1 receives ping messages from node A, node B, node C, node P, and node Q (step 1010). Similarly, the genesis node G2 receives the ping message 1060 from node A. The genesis node G3 receives the ping message 1070 from node C.

The genesis node then decides whether to select the node (e.g. A, B, C, P, Q . . . ) to join a pulse group based on predetermined criteria (step 1015). The criteria can first include whether a pulse group that the genesis node is currently initiating or managing needs more nodes. For example, each pulse group may require a minimum number of nodes. If that minimum threshold (e.g. 20 nodes or 100 nodes per pulse group) is not being met yet, the genesis node (e.g. G1) can select the node (e.g. node A) in response to the ping message received from the node. Secondly, the number of relays that a node has provided is a good indication of the potential value that a node can bring into a pulse group. Additionally, the genesis node (e.g. G1) may select or not select a node based on the public port that the node connected to. If the node (e.g. node A, node B, node) is selected, the genesis node (e.g. G1) can respond to the ping message (step 1015) using reply messages 1055 to invite the image-message-sending node to join a pulse group, which can be pre-existing or in the process of being formed. Thus, a pulse group PG1 is formed comprising the genesis node G1, node A, node B, and node C (FIG. 1E).

Similarly, the genesis node G2 sends reply message 1065 to node A to invite node A to join a different pulse group initiated or managed by G2. The genesis node G3 sends reply message 1075 to node C to invite node C to join yet a different pulse group initiated or managed by G3. It should be noted that a node such as node A or node C can simultaneously join more than one pulse groups at a time under DARP.

In some embodiments, in addition to the pre-loaded list of public genesis nodes, a node (e.g. A, B, C, P, Q . . . ) installed with DARP codes can fetch additional genesis nodes and associated identification information from DARP from the distributed routing controller (105 in FIGS. 1A and 1B). For example, if node Q is not successful in joining the pulse group PG1, node P can continue to ping other genesis nodes to attempt to join other pulse groups. If not successful, it can fetch more genesis nodes via DARP.

Once formed, the pulse group PG1 can be connected to a global directory 1410, which allows the nodes in the pulse group PG1 to find improved data routing paths with other nodes in different pulse groups such as PG2, PG3, and PG4. The searching for and communications with other nodes in a global directory are discussed in detail below in relation to FIGS. 14 and 14A.

If the pre-determined criteria are not met, the genesis node (e.g. G1) can reply to the node (e.g. node Q) but not to add the node to the pulse group PG1 based on one or more of the pre-determined criteria described individually above. One such situation can be when the pulse group PG1 is already full, that is, PG1 has reached the maximum capacity and the genesis node G1 is not yet forming a new pulse group. G1 can decide to keep communication channel open with node Q. Another situation may be that node Q does not show enough value (e.g. for relaying or validating, etc.) that is currently needed in the pulse group PG1.

In some embodiments, the node (e.g. node P) is not reliable, stable, or has other types of faults in the past. Moreover, node P can be on a list of problematic nodes published by DARP. Base on those, the genesis node G1 may decide not to reply to the ping message from node P.

Once a pulse group is formed, referring to FIGS. 1A-1E, one-way latencies between nodes in the pulse group are automatically measured (step 1020). Under the instructions of the distributed autonomous routing protocol (DARP) in the installed computer codes, the nodes 110-150 continually send pulse messages comprising the nodes' state information to each other in peer-to-peer connections 180. Similarly, the nodes G1, A, B, C continually send pulse messages to each other within the pulse group PG1. The state information includes a time stamp associated with the sending time of a pulse message sent by a particular node (e.g. 110, or node A) in the pulse group 160. In the present disclosure, the tem "pulse message" refers to the messages regularly sent between peer nodes in a common pulse group for measuring one-way latencies between nodes. Optionally, the state information can also include reception time stamps of the pulse messages previously received by the particular node (e.g. 110) from other nodes (i.e. 120-150, or node G1, node B and node C).

One-way latencies are calculated by subtracting the reception time stamp by the sending time stamp of each pulse message in a uni-direction between a pair of nodes in the pulse group 160 or PG1. In a pulse group comprising an integer n number of nodes, $n*(n-1)$ number of one-way latencies can be continually measured and calculated for the pulse group. The one-way latencies (OWL) can be calculated by receiver nodes and shared with all members of the pulse group 160. Specifically, each node can be responsible for updating the OWL values of the one way communications received by that node. For example, referring to FIG. 2A, the node D is responsible for updating the OWL values in the column "To D" in the OWL matrix 200. In FIG. 2A, nodes A-E can respectively represent nodes 110-150 in FIGS. 1A and 1B. Similarly, an OWL matrix 1090 is set up and recorded for the pulse group PG1 in FIG. 1E.

The pulse messages can be light weight and adds very little traffic overhead to the computer network. In some embodiments, each of the pulse messages can include a single data packet that contains the state information such as the first time stamp. The state information contained in pulse messages can be used for measurement purposes, that is, for recording time stamps and for calculating latencies. In some embodiments, as described below in conjunction with FIG. 6, pulse messages can carry information for other operations of the pulse groups as well as for applications.

All the measured one-way latencies within the pulse group 160 are reported by the nodes 110-150 to the pulse group 160. The measured OWL values are combined and tabulated in OWL matrices (or OWL tables) 115, 125, 135, 145, 155 (FIG. 1B), which are stored in computer memories of the nodes 110-150. The OWL matrices (or OWL tables) 115, 125, 135, 145, 155 are continually updated using the latest measured OWL values and shared among the nodes 110-150 in the pulse group 160. Thus each node 110-150 has a full-mesh real-time one-way latency matrix within its pulse group 160. Similarly, one-way latencies are reported by the nodes A, B, C, G1 within the pulse group PG1 and recorded in the OWL matrix 1090 (FIG. 1E).

The computer network 100 can include a public network, or a private network, or a combination of both. In a public network, once a host computer node sets up a pulse group, any node in the public network (e.g. the Internet) can connect to one of the nodes in the pulse group by receiving the computer codes containing the distributed autonomous routing protocol to join the pulse group. In a private network, one genesis node (such as node 110 in FIGS. 1A and 1B, or G1 in PG1 in FIG. 1E) starts a pulse group by inviting a few nodes to join a pulse group (steps 1000-1015 in FIG. 1C). As shown in FIG. 1A, the genesis node such as node 110 includes the computer memory 115 that stores the computer codes and the processor 117 that executes the computer codes and implements instructions under the distributed autonomous routing protocol. The genesis node is part of the pulse group and it manages the population in its pulse group such as additions of nodes to the pulse group and deletions of nodes from the pulse group.

A distinct advantage of the presently disclosed system and method is that clock synchronization is not required among the nodes 110-150 in the pulse group 160 (or between nodes G1, A, B, C in PG1). The clocks of the nodes 110-150 can have significant skew or offsets from each other, which will not affect the determination and the selection of the better routing paths among the nodes 110-150 in the pulse group 160.

In some embodiments, referring to FIG. 2A, measured one-way latency values in a pulse group comprising nodes A-E are tabulated in a distributed full-mesh OWL matrix 200. The one-way latencies from each of the five nodes A-E to other nodes result in 20 latency values (n(n−1), wherein the exemplified n number of nodes in the pulse group is 5) in the OWL matrix 200. For examples, the latencies from node A, node B, node C and node E to node D are respectively 51, 53, 100, and 25 (msec). The latencies from node C to node A, node B, node D and node E are respectively 50, 34, 100, and 91 (msec). As discussed above, in one implementation, the OWL values in column "To A" are calculated using the two above described time stamps and updated by node A; the OWL values in column "To B" are calculated and updated by node B, and so on. Moreover, latencies between two nodes can be different in forward and reverse directions. For example, the latency from node C to node D is 100 msec. and the latency from node D to node C is 85 msec.

It should be noted that the latency numbers, the number of nodes within a pulse group, the number of pulse groups, and specific exemplified configurations in the Figures in the present disclosure are used only for the purpose of illustrating the disclosed systems and methods, which should not limit the scope of the disclosed invention.

It should be further noted that the OWL values in the OWL matrix 200 are raw latency values derived from measured timestamps of the different node computers that are generally not synchronized. These raw latency values can be positive or negative, and the values can be significantly different from the true latency values measured between nodes having synchronized clocks.

In some embodiments, the OWL matrix 200 (or 1090) can be used as a routing table for determining a better performing path between two nodes within the pulse group. The distributed autonomous routing protocol contained in the computer codes downloaded from the distributed routing controller 105 enables autonomous calculations and determinations of better performing paths within the pulse group. In one aspect, the better performing data routing path is measured by the lower or the lowest total latency from the sending node, via one or more relay or intermediary nodes, to the destination node. The total latency is the sum of the latencies of all node-to-node transmission segments along the routing path.

From the OWL matrix 200, the direct routing path (i.e. typically the shortest path) from node C to node D, which is recommended by a conventional centralized Internet protocol-instruction provider, has a latency of 100 msec. In contrast, the presently disclosed systems and methods can improve the performance of the data routing from node C to node D by allowing additional intermediary or relay nodes between node C and node D. Using the OWL matrix 200, the presently disclosed methods explore and evaluate total latencies along other possible routing paths. For example, the path from node C to node A then from node A to node D has a total latency of 50+51=101 msec.; the path from node C to node E then from node E to node D has a total latency of 91+25=116 msec. The two above alternative paths would result in slower data transmissions, which are not good alternatives to the direct path. A better performing data routing path is found using node B as a relay node: the segments of node C to node B and then from node B to node D have a combined latency value of 34+53=87 msec., which is below the 100 msec. latency value of the direct path from node C to node D. Thus the path using node B in the pulse group as a relay node provides decreased latency comparing to conventional methods. In some embodiments, a better performing path can also include two or more relay nodes between the sending node and the destination node.

In the above example, the better performing routing path is independent of clock skews. For example, if the clock at node D is skewed by minus 50 msec., the latencies from node A, node B, node C and node E to node D would now be respectively 1, 3, 0, and −25 (msec); the latency values in the column to node D are all shifted down by 50 msec. The better performing routing path from node C to node D will still be from node C to node B, then from node B to node D because all alternative paths have their respective summed latency values all shifted down by the same amount (i.e. 50 msec of latency time). It should be noted that negative latency values are allowed in the OWL matrix, which do not affect the determination of the better performing routing paths as described above.

After a pulse group is formed, the pulse group can be validated and maintained based on criteria such as stability of the nodes and opportunities within the pulse group. The stability of the member nodes within the pulse group can be measured by the degree of jittering or fluctuations in the one-way latencies measured at each node in the pulse. Quantitative metrics can also be established to measure the potential or capabilities that the nodes within a pulse group can provide improved data routing amongst each other.

Figure 1C:
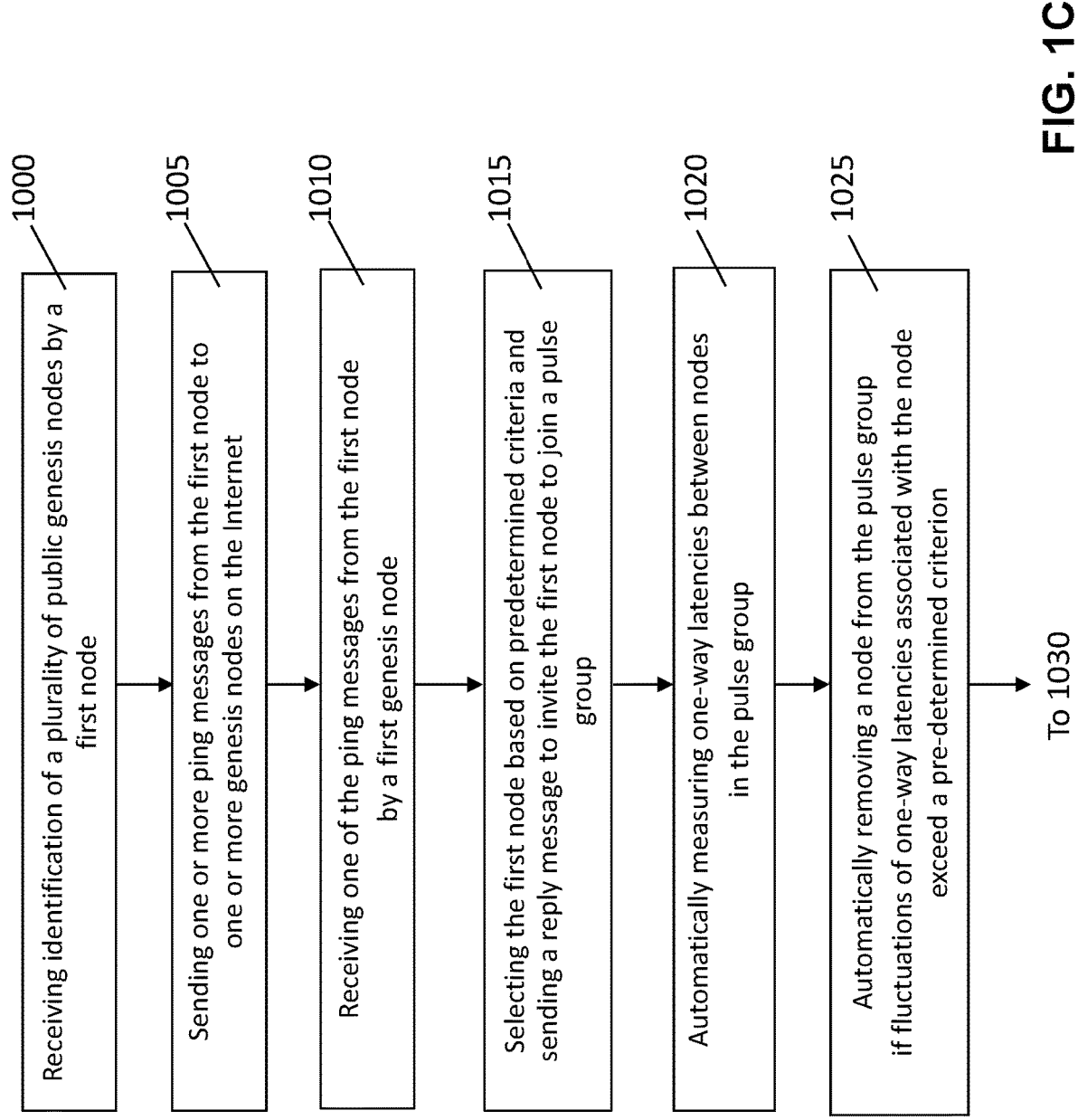
FIG. 1C is a flowchart for automatically forming and optimizing a pulse group of distributed computer nodes for data routing over the Internet.
Figure 1D:
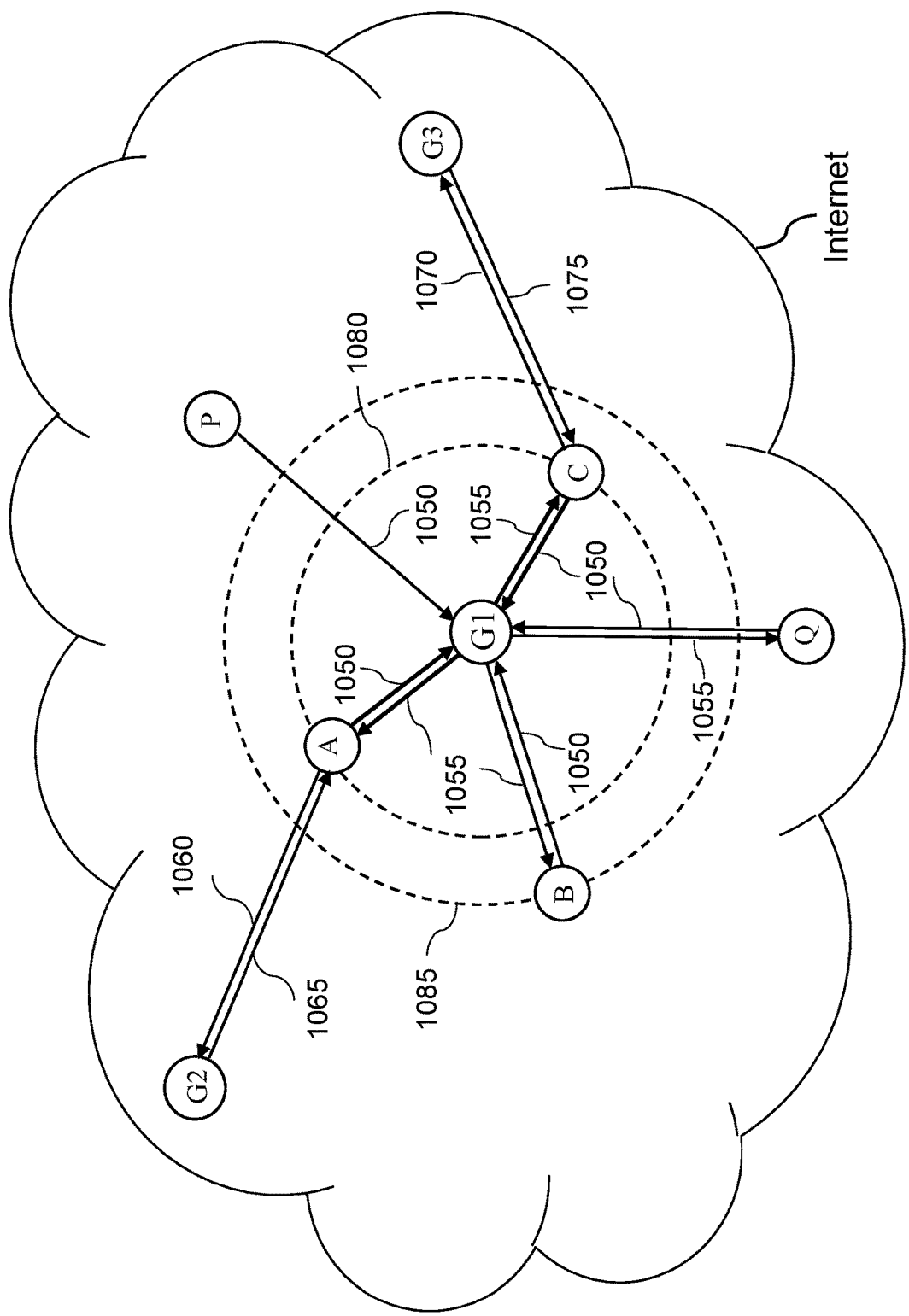
FIG. 1D illustrates how prospective computer nodes connect to a genesis node over the Internet to join in a pulse group in accordance with some embodiments of the present invention.
Figure 1E:
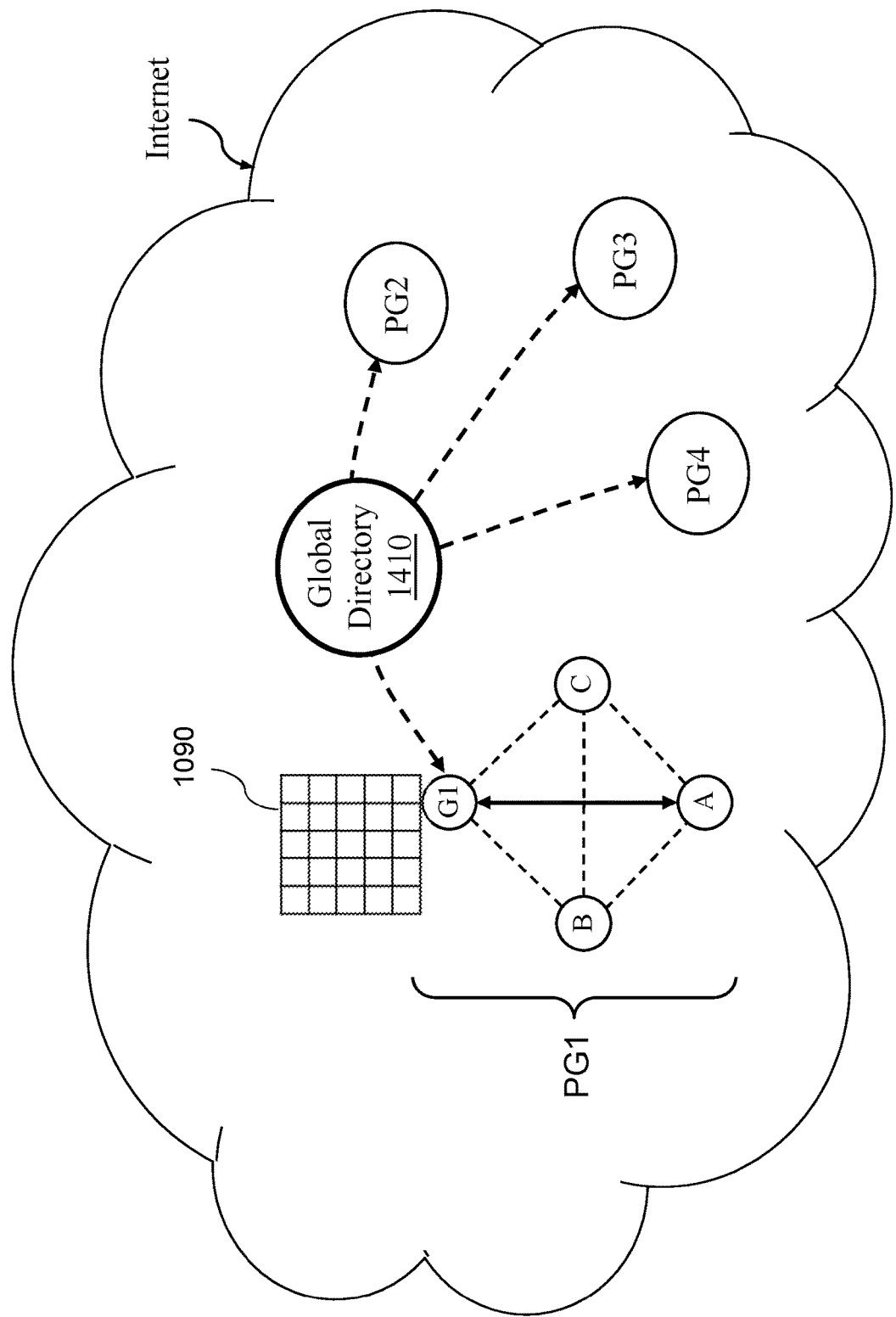
FIG. 1E shows the formation of a pulse group by computer nodes shown in FIG. 1D in a global directory.
Figure 2B:
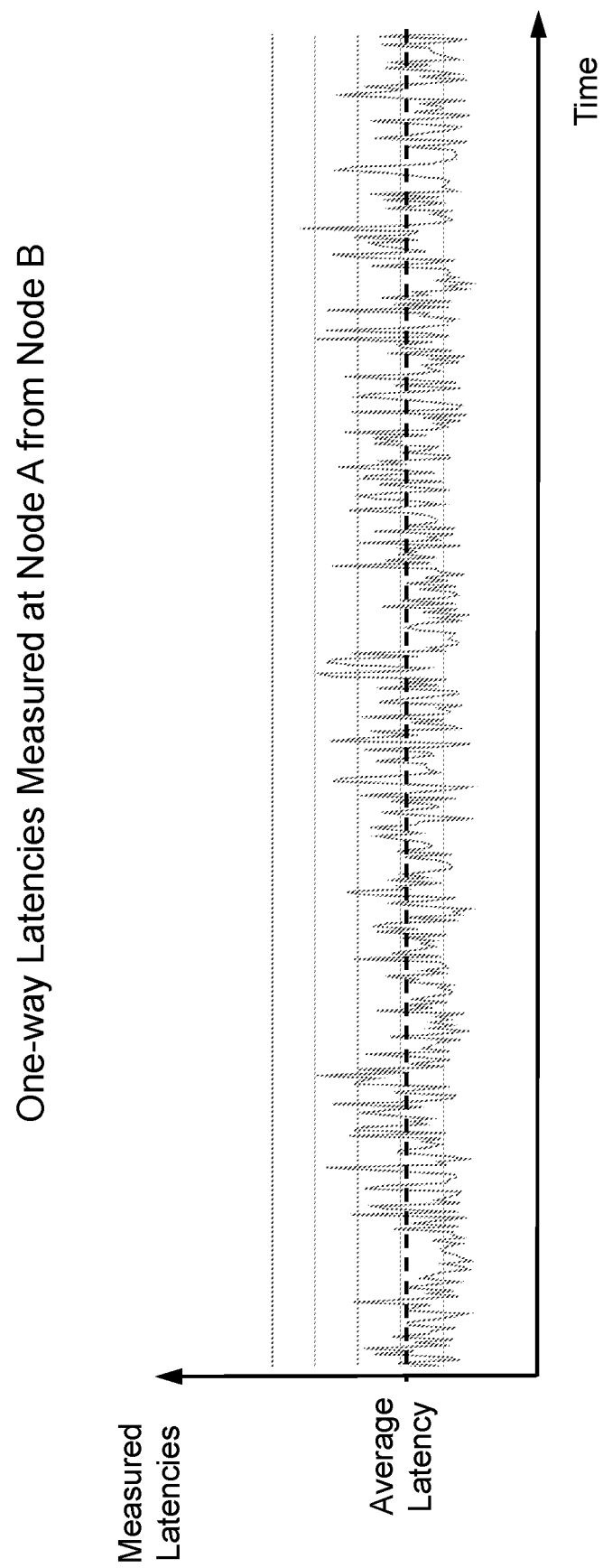
FIG. 2B is an exemplified time series of OWL values measured at a computer node in a pulse group.

In some embodiments, referring to FIGS. 1C, 1E, and 2B, under DARP, a node can be automatically removed from the pulse group if fluctuations of one-way latencies associated with the node exceed a pre-determined criterion (step 1025). FIG. 2B shows an exemplified time series of one-way latency from node B to node A in the pulse group PG1, which is measured at node A. The time series of one-way latency from node B to node A is characterized by fluctuations around an average latency. If the fluctuations are too large, it is difficult and inaccurate to determine the latency performance of a node (e.g. node A) in a pulse group, and it makes it unreliable and error-prone to identify improved data routing paths within the pulse group. The node at issue is thus automatically from the pulse group. The automatic removal of non-performing nodes from a pulse group is one way how DARP maintains the stability and performance of all pulse groups within the global directory (1410 in FIGS. 1E, 14, 14A).

Over the Internet, various computer nodes (e.g. node A, node B, and node C) in a pulse group are located at different "distances" from the genesis node (e.g. G1) as measured by the latency time of data exchanges between the genesis node and the other nodes; the shorter the round-trip latency the closer the distance. Thus these nodes can be considered as at different orbits of varying radii around the genesis node depending on their proximity to the genesis node. For example, node A and node C are located in orbit 1080 and node B is located at orbit 1085 (FIG. 1D).

In some embodiments, the orbits around genesis nodes can help nodes of different pulse groups to route data to each other. For example, referring to FIGS. 1D, 1E, and 2A, node A is at an orbit of 5 msec from a genesis node G1 in a pulse group PG1; and another node Z in pulse group PG2 is at an orbit 10 msec away from another genesis node G2 in a pulse group PG2. If G1 and G2 have known latency measurements between them, the total latency time would be known for the routing path from node A to node Z via G1 and G2 as relay nodes. If that overall latency is shorter than that of the direct path from node A to node Z, then the A-G1-G2-Z two-hop will provide an improved data routing path from node A to node Z without forming a new pulse group comprising node A and node Z (disclosed in FIGS. 13-18C).

In some embodiments, referring to FIGS. 1C-1E and 2A, as part of the maintenance of a pulse group, a genesis node can automatically remove a node from the pulse group based on latencies between the node and the genesis node (step 1030). The one-way latencies in each direction or the round-trip latency times can be obtained from the OWL matrix (200, or 1090) for the pulse group. In some embodiments, the genesis node may keep nodes in a pulse group in proximity to the genesis node. If for example, the node Q has joined a pulse group managed by the genesis node G1, the genesis node G1 may determine that node P is too far from G1 based on its long round-trip latency time and removes node P from the pulse group.

If one or more nodes have been removed from the pulse group, one or more additional nodes can be optionally invited to join the pulse group (step 1035). In some embodiments, a pulse group may be required to have a minimum number of nodes under DARP. The removal and loss of one or more nodes may automatically trigger the identification and selections of suitable nodes as described in steps 1000-1010 (FIG. 1C) above and the invitation and addition of additional nodes into the pulse group as described in step 1015 (FIG. 1C).

Figure 2C:
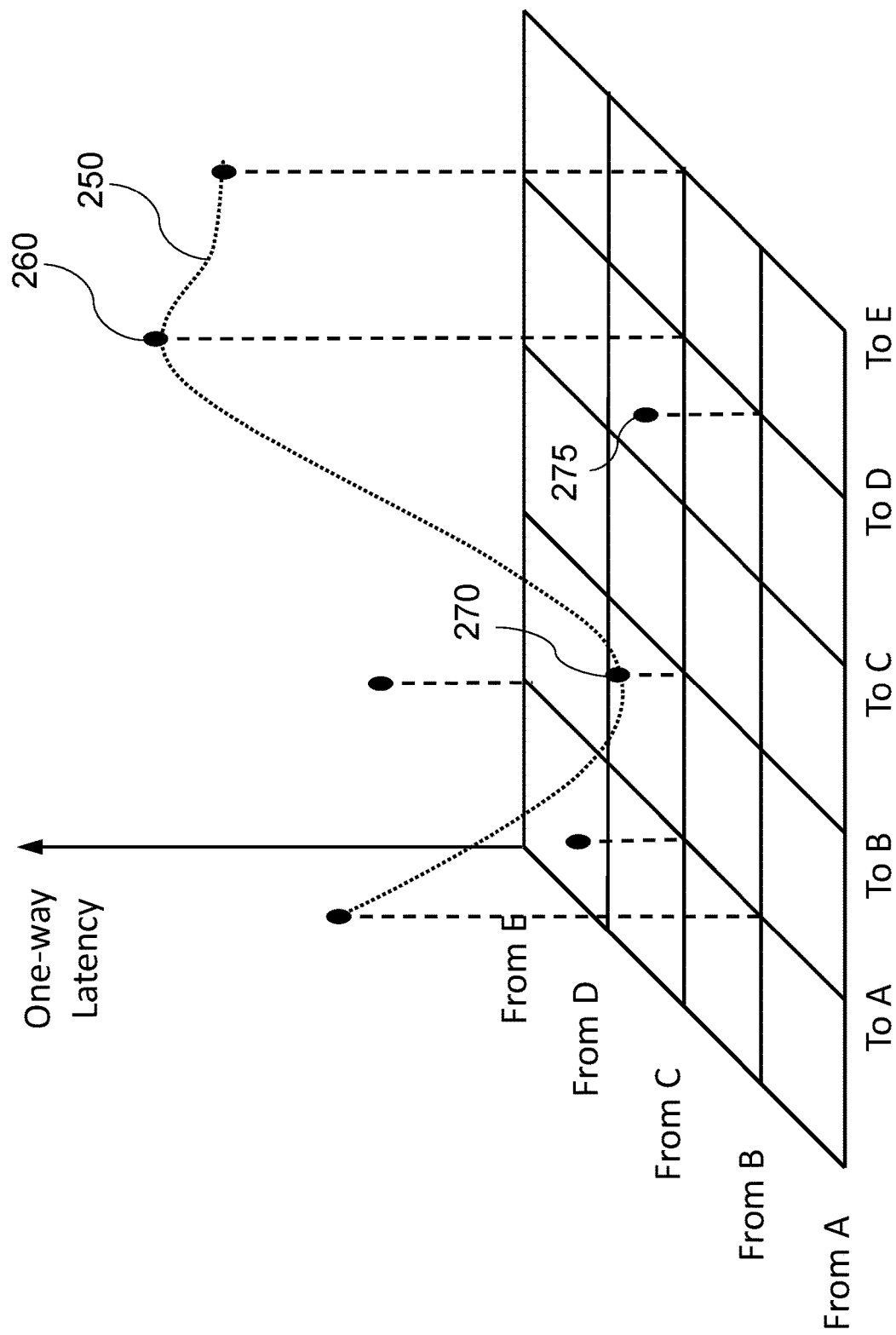
FIG. 2C illustrates the landscape of OWL values in a pulse group, which contains information about the potential for the pulse group to provide data routing paths having reduced data transfer latencies.

Next, referring to FIGS. 1C, 2A, and 2C, the probability for a pulse group to be able to provide better data routing paths amongst nodes therein is quantitatively evaluated by comparing OWL values between different pairs of nodes in the pulse group (step 1040). The OWL data recorded for a pulse group can be visualized more clearly in a three-dimensional plot as shown in FIG. 2C. The average OWL values measured at different node combinations are plotted at different heights (260, 270, 275) and the contours 250 of the OWL values can be quantitatively evaluated to determine potential for data routing improvement within the pulse group (step 1040). The contour 270 (or landscape) can include a peak OWL value 260 and a valley OWL value 270, and a low OWL value 275. Using the examples in FIGS. 2A and 2C, the peak OWL value 260 is located at the cross point from node C to node D and the low OWL values are respectively located at the cross point from node C to node B and the cross point from node B to node D. For a relayed data routing path to have an overall latency lower than that of the direct path, the peak OWL value 260 need to be higher than the sum of the OWL values 270, 725 at the different segments of the relayed data path (step 1040). In other words, $t\_p > t\_1 + t\_2$, in which $t\_p$ is the peak OWL value, which can be the OWL of the direct data path being evaluated, and $t\_1$ and $t\_2$ are respectively the OWL values of the two segments of the alternative data routing path relayed by node B.

In general, when a relayed data routing path has one relay node, the peak OWL value needs to be at least twice the valley OWL value for an improved data routing path to exist in a pulse group (because $t\_1$ plus $t\_2$ are equal or more than twice the valley OWL value) (step 1040). When fluctuations (or variance) in one-way latencies are taken into account, the peak-to-valley ratio for the average measured OWL values in a pulse group should be more than 2.5, or 3.0 to provide reliable improved data routing via a relay with decreased total latency. At a peak-to-valley ratio of 3.0, a 20% swing in both the peak and the valley OWL values will still result in a temporary peak-to-valley ratio of at least 2.0.

When data routing with two relay nodes (see FIG. 11 and related discussions below), the peak OWL value needs to be at least three times the valley OWL value for an improved data routing paths to exist in a pulse group. When data routing with an integer n number of relay nodes, the peak OWL value needs to be at least (n+1) times the valley OWL value for an improved data routing paths to exist in a pulse group (an equivalent statement is that the peak-to-valley OWL ratio needs to be larger than (n+1)) (step 1040). Here, the average OWL values are used to measure stable performance properties at different nodes in a pulse group.

If the peak-to-valley ratio of the average measured one-way latencies between different pairs of nodes in the pulse group is below a threshold (2.0, or 2.5 or 3.0 for a one-hop relay involving single relay node, or (n+1) for n-hop data routing paths) as described above, the pulse group does not have opportunities or potential for better data routing. One or more additional nodes can be invited to join the pulse group (step 1045). The additional nodes can be selected based on the round-trip latencies of their respective responses to the ping message sent by the genesis node. Certain redundant nodes can also be removed from the pulse group if they are not stable as described above, or do not provide relay function or require data routing needs. The revised pulse group can be re-evaluated to determine if the peak-to-valley ratios in the updated OWL matrix can be increased to above 2 for providing data routing paths involving a single relay node. For data routing paths comprising n number relay nodes, the peak-to-valley ratios in the updated OWL matrix need to be above (n+1), where n is an integer number.

With the nodes in a pulse group having stable measured OWL times and possessing a good potential for better data routing path as described above, a lower-latency data routing path can now be automatically determined in the pulse group based on the one-way latencies (step 1050). As described above, an example of a lower-latency data routing path from node C to node D is described above from node C to node B and from node B to node D with node B being the relay node. Other examples of improved data routing in a pulse group using DARP is described below in relation to FIG. 11.

Additional steps can include the following, as described in details below in relation with FIGS. 9, 12, and 13, and other figures: one-way latencies are automatically recorded between nodes in the pulse group in a one-way latency matrix (115, 125, 135, 145, 200, 1090 in FIGS. 1B, 1E, 2A). Payload data is then sent from the first node to the second node via relay nodes on the high-speed data gateway according to the lower latency data routing path (in relation to FIGS. 7-12). A transfer of payment by the first node or the second to an entity can be automatically recorded as described below (in relation to FIGS. 7-12).

Figure 3:
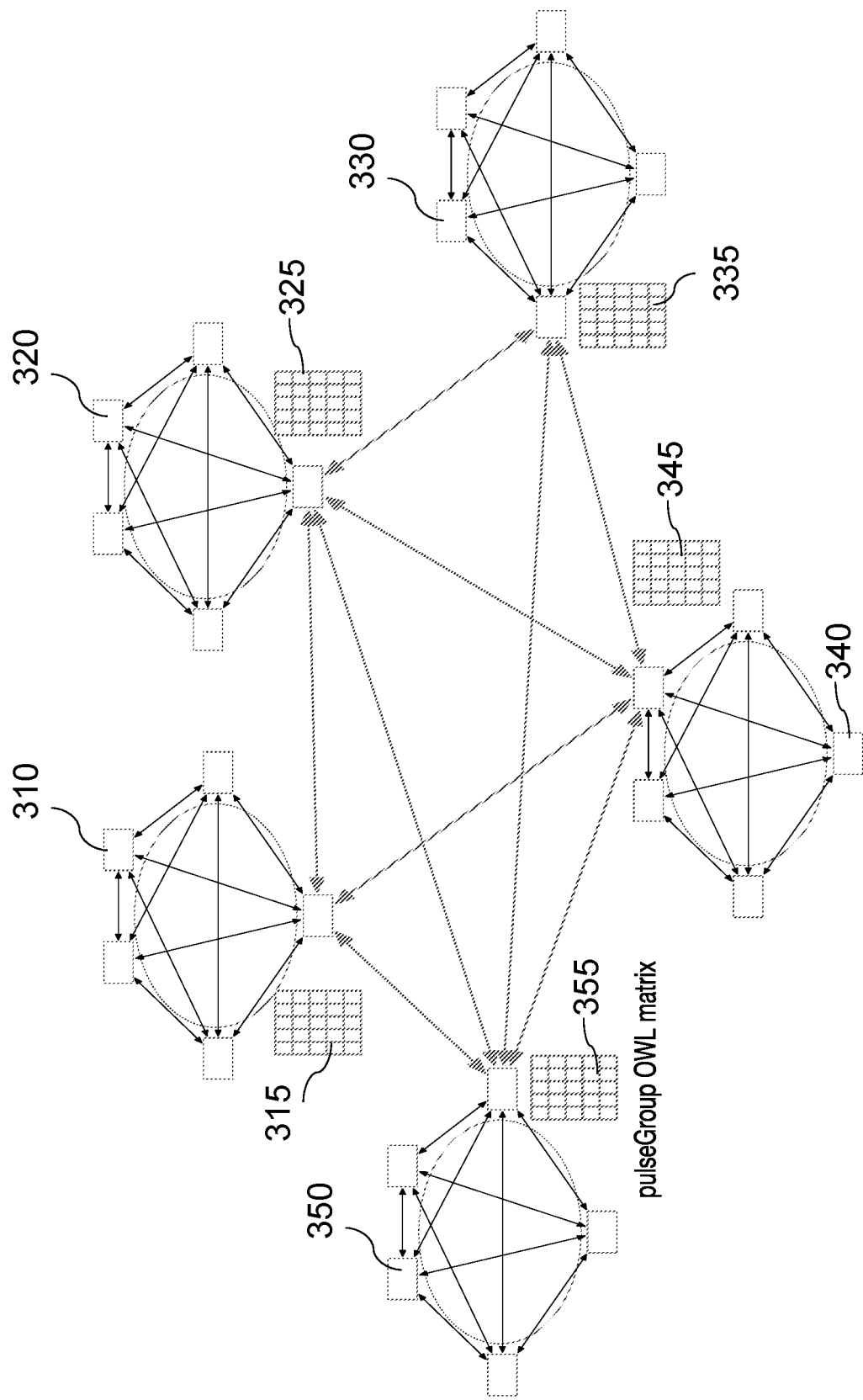
FIG. 3 depicts an exemplified schematic diagram showing multiple pulse groups having updated OWL matrices within and between pulse groups for providing a global directory service in accordance with some embodiments of the present invention.
Figure 4:
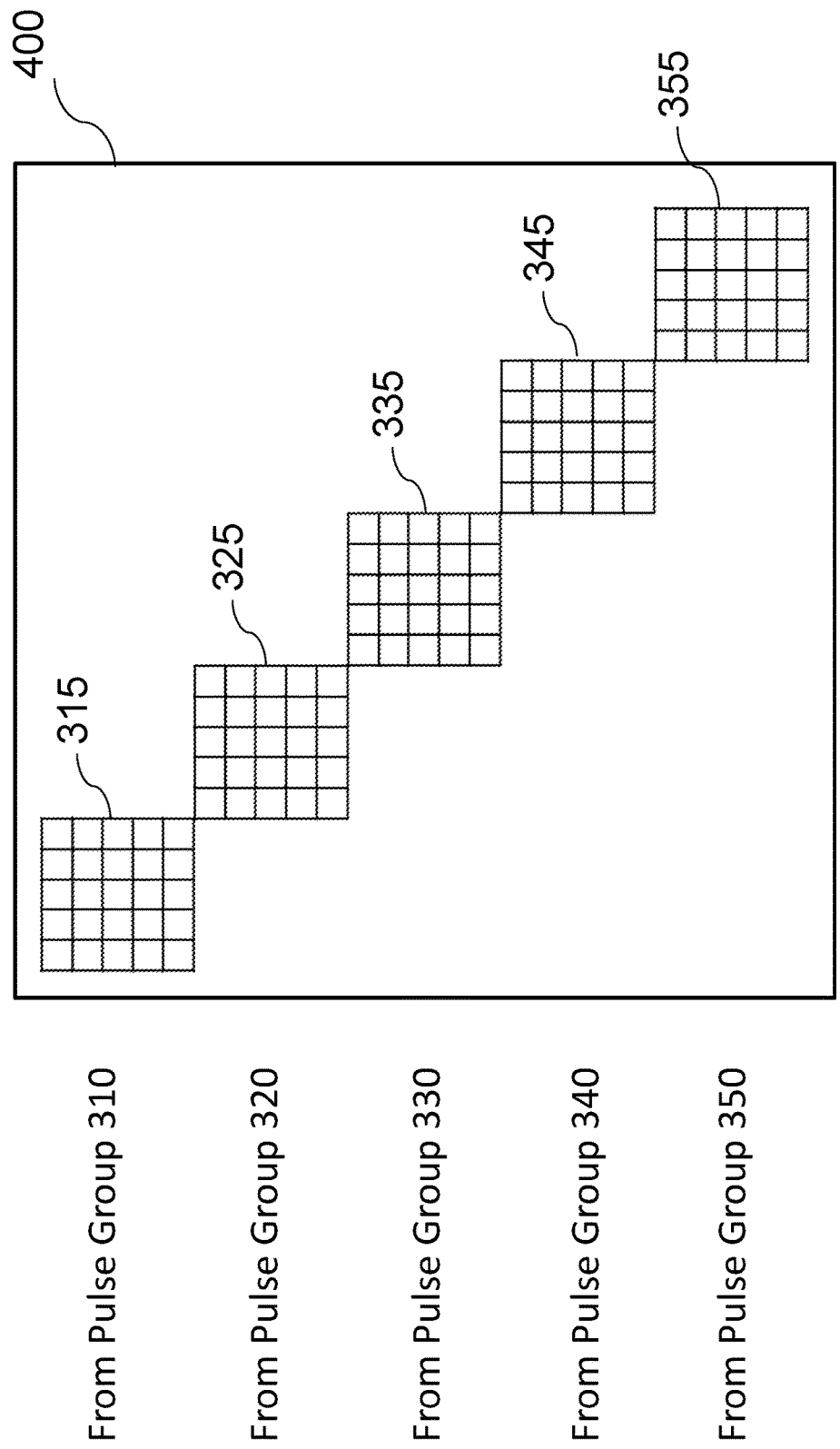
FIG. 4 shows an exemplified directory for the pulse groups shown in FIG. 3.

In some embodiments, referring to FIGS. 3 and 4, a plurality of pulse groups 310-350 can exchange their respective OWL matrices 315-355 to provide a global directory for all the nodes participating in the pulse groups 310-350 on the Internet across the globe. The form of the global directory is a partial mesh OWL matrix 400 as shown in FIG. 4. The partial mesh OWL matrix 400 is a table of OWL matrices 315-355, which can be used as the basis for algorithmic dynamic pulse group creation and for latency-based routing decisions.

For example, when a first node in pulse group 310 is attempting to send data to a destination node in pulse group 320, the first node has the public key (or an IP address, a DNS name, or other identification information) of the destination node and will inquire about the destination node at its genesis node in pulse group 310. The genesis node in pulse group 310 communicates with other Genesis nodes of the other pulse groups 320-350. Each of those Genesis nodes searches for the public key in their respective groups. The genesis node of pulse group 320 identifies the destination node using the public key and notifies the genesis node of pulse group 310 and the first node.

To establish latency measurements between the first node and the destination node, the genesis node of pulse group 320 can invite the first node to join pulse group 320. The OWL matrix 325 is updated with latencies from and to the first node, which allows calculations and determination of a better performing path from the first node to the destination node. Alternatively, a new group can be formed that includes a hybrid of pulse group 310 and pulse group 320. The new group includes the first node and the destination node as well as some or all other nodes previously in the two groups. An OWL matrix is established and updated as described above. A better performing path can be determined from the first node to the destination node. It should be noted that the nodes in pulse group 310 and pulse group 320 can join the new group while still staying in their respective original pulse groups. In other words, each node can simultaneously join multiple pulse groups. More details about algorithmic pulse group formation in response to data transport needs are described below in relation to FIGS. 13-18.

Figure 5:
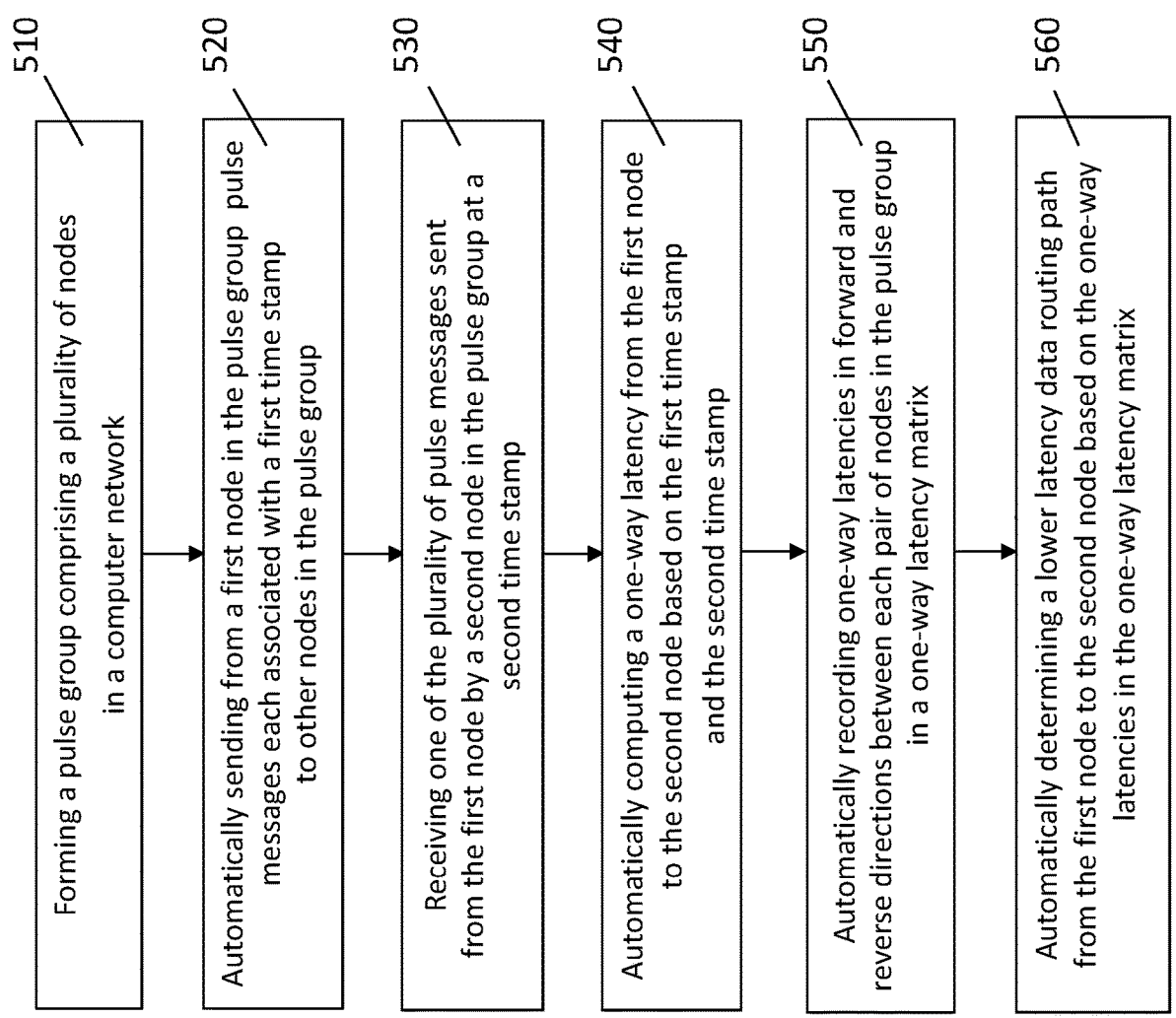
FIG. 5 is a flowchart for the formation and operations of pulse groups in accordance with some embodiments of the present invention.

In some embodiments, the formation and operations of pulse groups can include one or more of the following steps. Referring to FIG. 5, a pulse group that includes a plurality of nodes in a computer network is formed (step 510). As described above, the plurality of nodes can first receive computer codes from a distributed routing controller. Once executed by nodes' respective computer processors (e.g. 117 in FIG. 1), instructions from the codes establish secure communications among the nodes. Pulse messages (or pulse messages) are automatically sent between nodes in the pulse group (step 520). The pulse message automatically sent from a first node to a second node in the pulse group (step 520) includes a first time stamp associated with the sending time of the specific pulse message. The pulse message is received by the second node at a reception time associated with a second time stamp (step 530).

Next, a one-way latency from the first node to the second node is automatically calculated based on the first time stamp and the second time stamp (step 540). In one implementation, the one-way latency from the first node to the second node is automatically calculated by the computer at the second node by subtracting the second time stamp by the first time stamp.

In some embodiments, the pulse message sent by a first node can further include reception times of the pulse messages previously received by the first node from other nodes in the pulse group. In this way, each node in the pulse group will have the first time stamp and the second time stamp of the pulse messages in both directions between that node and other nodes in the pulse group. The availability of the first time stamp and the second time stamp to the sending and the receiving nodes of the pulse messages allow the nodes to independently calculate latencies in both sending and receiving directions. The redundant calculations of the one-way latencies can serve as validation of OWL in the pulse group and ensure reliability of the OWL data in the OWL matrix.

The one-way latencies in both forward and reverse directions between each pair of nodes in the pulse group are automatically recorded in a one-way latency matrix (step 550) by the nodes in the pulse group. These measured values are latencies for the direct paths between nodes in the pulse group. Specifically, the one-way latency from the first node to the second node in the one-way latency matrix can be updated by the second node after it calculates the updated one-way latency value as described above.

The OWL matrix is continually updated and shared in real time among all the nodes in the pulse group. For example, pulse messages can be sent by each node in the pulse group at a regular 1 second interval for the continued OWL measurements.

Using the one-way latencies updated in real time in the OWL matrix, a better performing data routing path with a lower latency from the first node to the second node can be automatically calculated (step 560). The better performing data routing path can include at least one relay node in the pulse group, a first transmission segment for the first node to the relay node, and a second transmission segment for the relay node to the second node. An example of such better performing data routing path is described above in the path from node C to node B and node B to node D in relation to FIG. 2A. In some embodiments, there could be more than one relay node in the better performing data routing path. The total sum of latencies in all the segments in the better performing data routing path is lower than the latency of the direct path from the first node to the second node.

By managing the population of pulse groups, the disclosed systems and methods provide a buffer to the overall network load. Whenever or wherever a computer network is overburdened with traffic and experiencing high latencies, the disclosed systems and methods can autonomously identify alternative routing path and alleviate the traffic latency or congestion, which result in more consistency and reliability in the network's performance.

The operations within a pulse group are now described. The computer codes downloaded from the distributed routing controller 105 and stored in the memory of each of the nodes in a pulse group (FIGS. 1 and 2) includes the same instructions and configuration information (i.e. defined by the distributed autonomous routing protocol) to be run on the nodes in the pulse groups. Once installed, the nodes in the same pulse group are instantly connected to other nodes in the pulse group over a secure connection.

Figure 6:
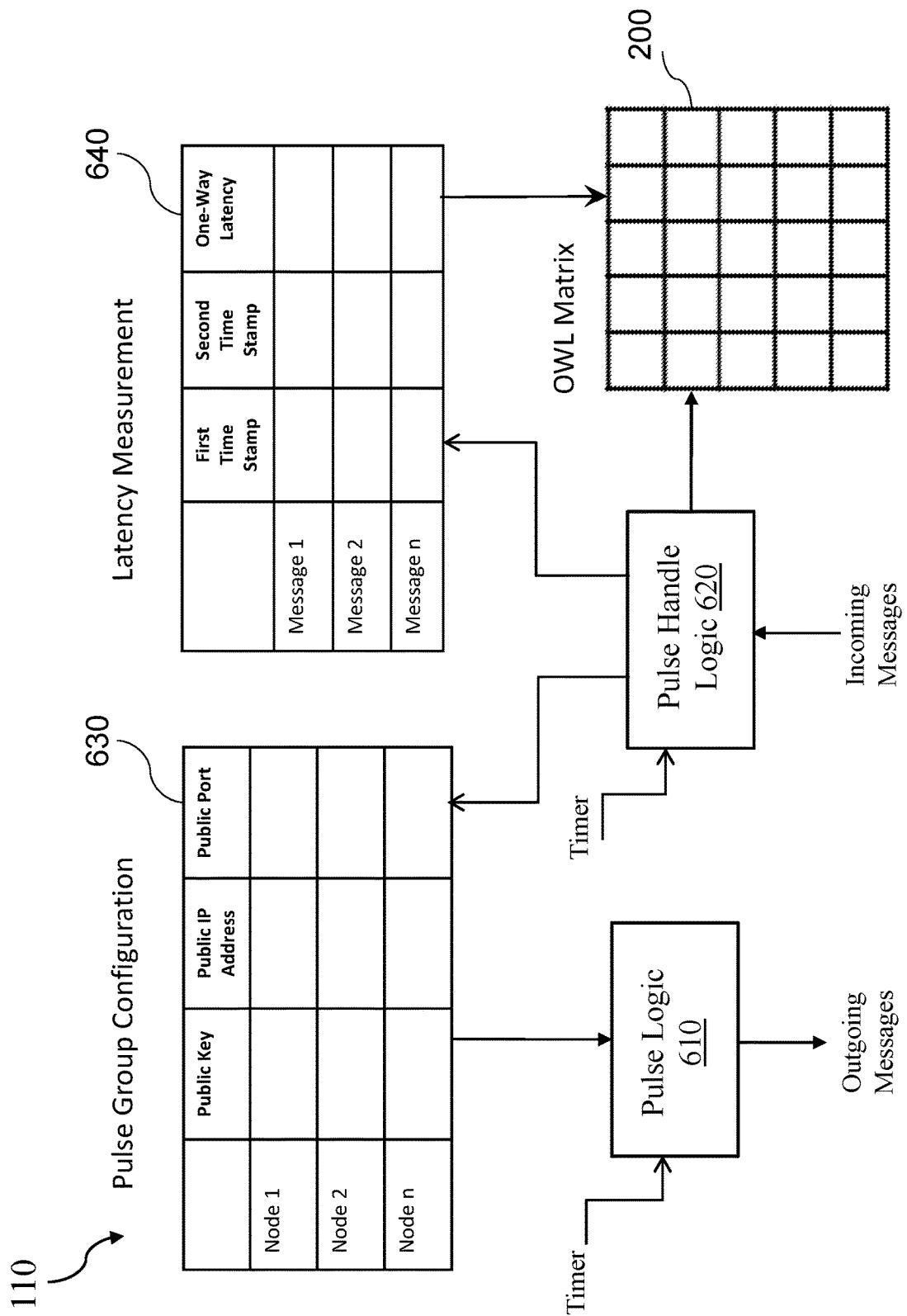
FIG. 6 illustrates detailed operations at a computer node in a pulse group in accordance with some embodiments of the present invention.

As shown in FIGS. 1A, 1B, and 6, a node (e.g. 110) in a pulse group receives computer codes from a distributed routing controller 105, which are installed on the node computer. The installed software enables the node computer to perform at least two logic functions: 1) Pulse Logic 610 for sending pulse messages to communicate state information to peer nodes in the same pulse group; and 2) Pulse Handle logic 620 for processing pulse messages (i.e. pulses) received from peer nodes within the pulse group.

The node computer stores a pulse group Configuration Table 630 and a Latency measurement Table 640 among other information related to implementing the distributed autonomous routing protocol. The pulse group Configuration Table 630 includes information about the nodes in the pulse group: public keys, public IP addresses, and public ports for the nodes in the pulse group. The information in this table ensures connections and communications between peer nodes in the same pulse group. For each message received by a receiving node in the pulse group, the Latency measurement Table 640 lists the first time stamp (i.e. the sending time recorded by the sending node), the second time stamp (i.e. the reception time recorded by the receiving node), and the one-way latency (OWL) calculated from the two time stamps.

Using the information in the pulse group Configuration Table 630, the Pulse Logic 610 regularly sends out pulse messages to peer nodes in the same pulse group (using a public key assigned to a specific node at a specific public IP address via the specified public port). In each such pulse message, the Pulse Logic 610 records a time stamp according to the timer or the local clock of the node computer at node 110 and stores the time stamp in that pulse message. The time stamp serves as the first or the sending time stamp of the associated pulse message, which the node receiving the particular pulse message can use to calculate a one-way latency time from node 110 to the receiving node.

As discussed above, pulse messages can generally include information for operations of the pulse groups as well as for applications. Information for operations can include state information that is used for measurement purposes, that is, for recording time stamps and for calculating latencies. In some embodiments, pulse messages can carry information for identifying and communicating with the nodes in the same pulse group. Pulse messages can also include information that ensures consistent operations of the pulse groups such as latency measurements and routing path selections such as software version of the computer codes and/or docker version shared between nodes for executing the distributed autonomous routing protocol. Al nodes in a pulse group run the same version of software for the proper operations with the pulse group.

The Pulse Handle logic 620 can receive different types of messages. When a new node joins the pulse group, the Pulse Handle logic 620 receives information (i.e. the public key, the public IP address, and the public port for the new node) that instantiates the pulse group, and adds the information the pulse group Configuration Table 630 (a new row for the node in 630).

Corresponding to the messages sent out, node 110 regularly receives pulse messages from peer nodes in the same pulse group. These received messages are also handled by Pulse Handle logic 620. For each received message, the Pulse Handle logic 620 records a second or a reception time stamp based on the timer or the clock of the local node computer. Pulse Handle logic 620 extracts the first (sending) time stamp from the received pulse message and records both the first time stamp and the second time stamp in the Latency measurement Table 640 for that message (e.g. message 1). Pulse Handle logic 620 then calculates a one-way latency (OWL) based on the first time stamp and the second time stamp. In one implementation, OWL is obtained by subtracting the first time stamp from the second time stamp. It should be noted, as described above, that the timer or the computer clock on node 110 may not be synchronized with the clocks on peer nodes 120-150 in the same pulse group. The clocks of the peer nodes can be skewed, or offset, such that the absolute OWL values may be different from the real latencies experienced in data transmission. The synchronicity however does not affect the determination of the better routing path.

As the OWL values are calculated from the received pulse messages, Pulse Handle logic 620 updates and records the current OWL values in the OWL matrix 200. In the specific configuration shown in OWL 200 (FIG. 2A), Pulse Handle logic 620 in node 110 is responsible for updating a column of the OWL values, which includes latency values for the one-way messages received from different peer nodes in the same group. As discussed above in relation to FIGS. 2 and 5, better performing data routing paths can be determined using the most updated OWL matrix 200.

Figure 7:
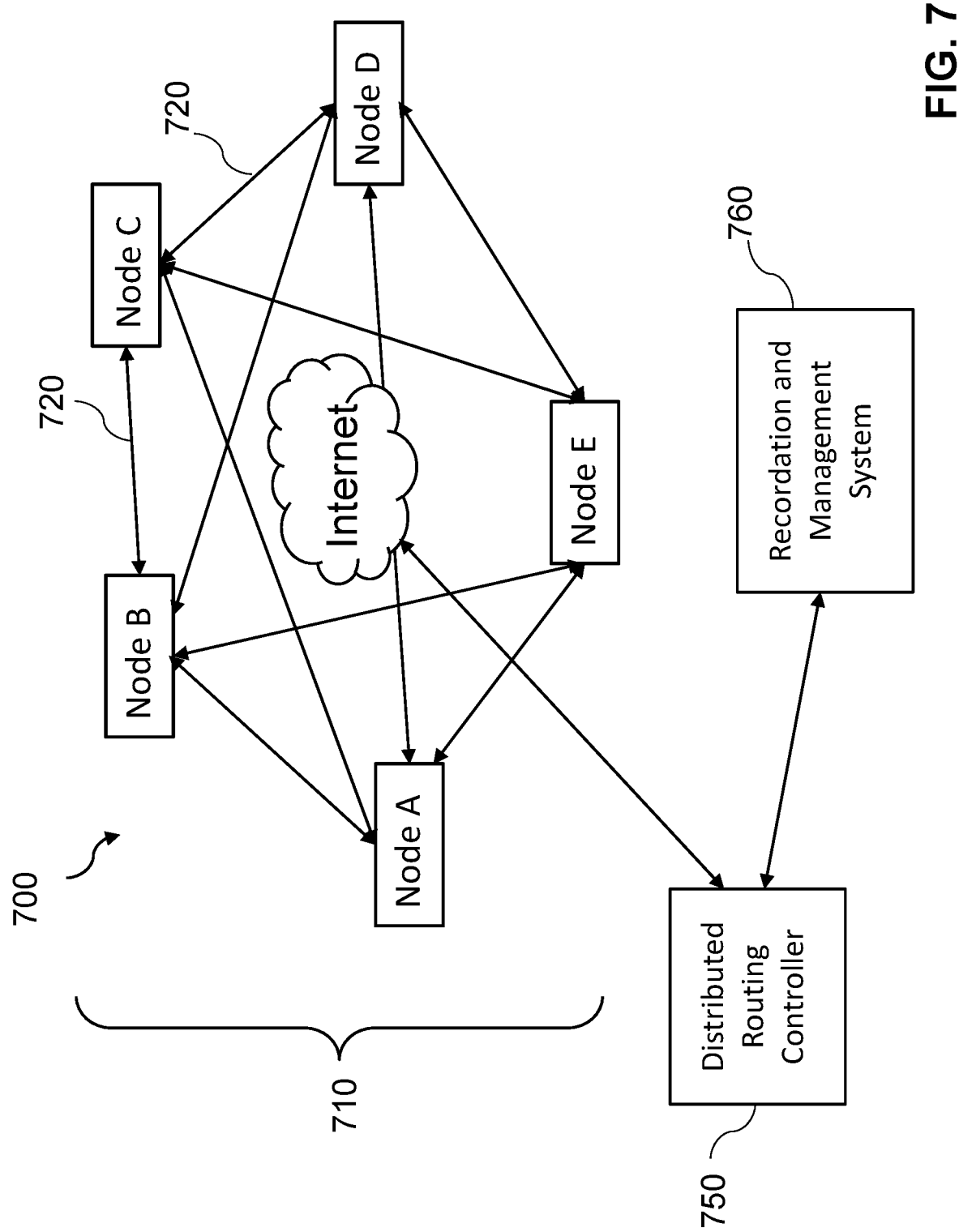
FIG. 7 shows a recordation and management system for facilitating better performing data routes between computer nodes in a pulse group in accordance with some embodiments of the present invention.

In some embodiments, referring to FIG. 7, in a computer network 700, a pulse group 710 is formed including node A, node B, node C, node D, and node E. The pulse group 710 is in communication with a distributed routing controller 750. In some embodiments, the distributed routing controller 750 can play a role in the initiation and ongoing management and performance of the pulse group 710. Similar to the functions of the genesis node described above, the distributed routing controller 750 can also initiate and form new a pulse group by sending Ping messages to nodes over a computer network (e.g. the Internet) and receiving messages from some nodes. In some embodiments, based on the analyses of the received messages, the distributed routing controller 105 can invite qualified nodes to join a new pulse group and an existing pulse group. The distributed routing controller 750 can periodically communicate a node (such as the genesis node) in a pulse group to receive the group's collective network state. The distributed routing controller 750 can convert performance matrices of pulse groups into a database of available data routing paths and their recently measured network performance characteristics.

As discussed above in connection with FIGS. 1A-2, 5, one-way latencies are continually measured between each pair of nodes A-E and recorded in an OWL matrix associated with the pulse group 710. A better performing data routing path can be determined between nodes (e.g. from node C to node D as shown in FIG. 2A) in the pulse group 710. A recordation and management system 760 is in communication with the distributed routing controller 750 and the pulse group 710. After a data transmission has been conducted via one or more relay nodes along a better performing data routing path selected as described above, a payment is made by an entity (a digital wallet or an account) associated with the node that requested the data transfer to an entity (a digital wallet or an account) associated with the one or more relay nodes that provided the better performing data routing path. Such payment is defined in the distributed autonomous routing protocol that is installed on the nodes A-E and distributed by the distributed routing controller 750. The node that requested the data transfer is normally the node that sends the data or the node that receives the data. The recordation and management system 760 can record these payment transactions, which provide economic incentives for the participation of the nodes in the pulse groups and for serving as relay nodes. The recordation and management system 760 can also keep track of the better performing data routing paths in different pulse groups, and the ratings of nodes in different pulse groups.

Figure 8:
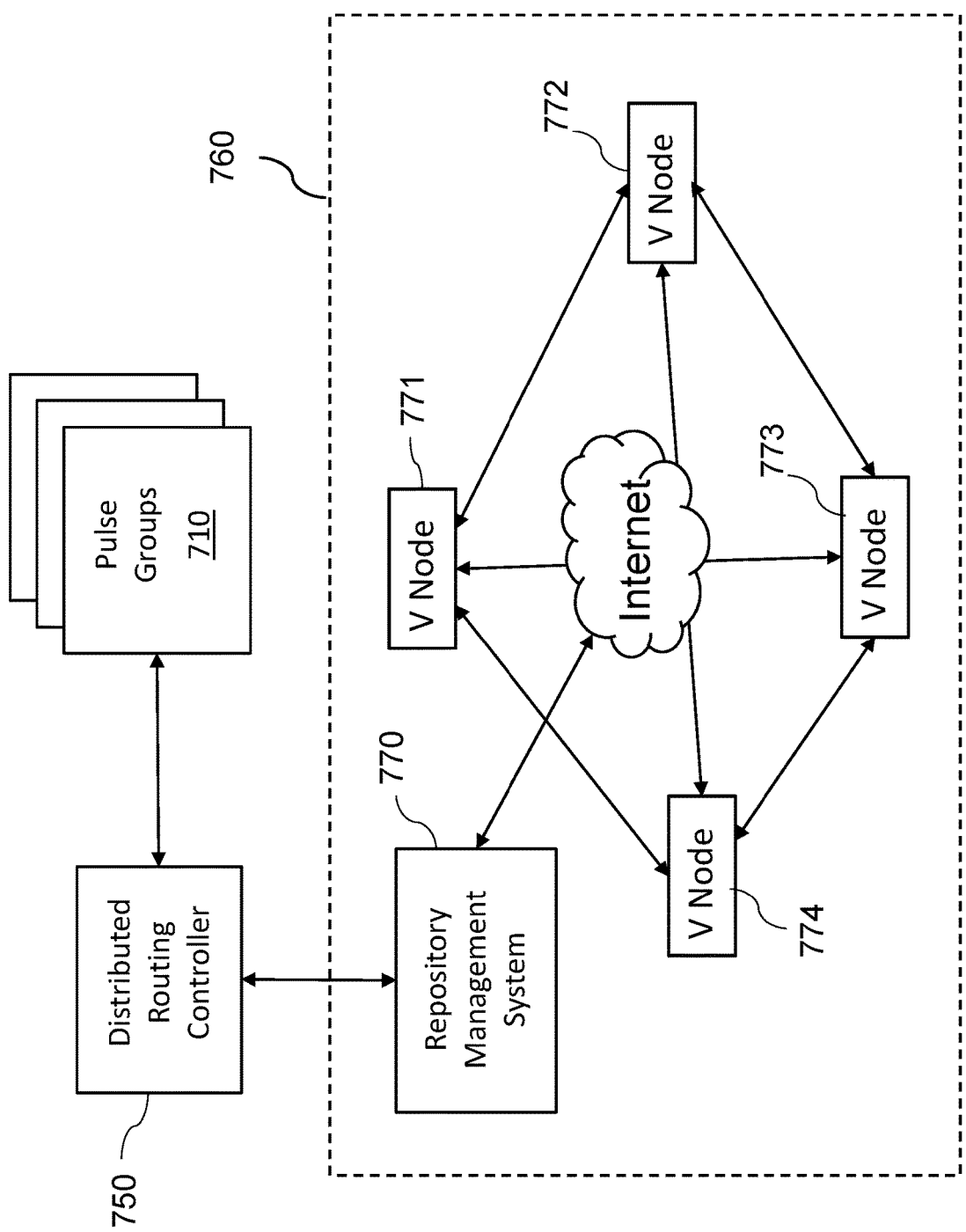
FIG. 8 shows details of an exemplified recordation and management system for facilitating compensations and recording credits for nodes that provide data routes between computer nodes in a pulse group in accordance with some embodiments of the present invention.
Figure 9:
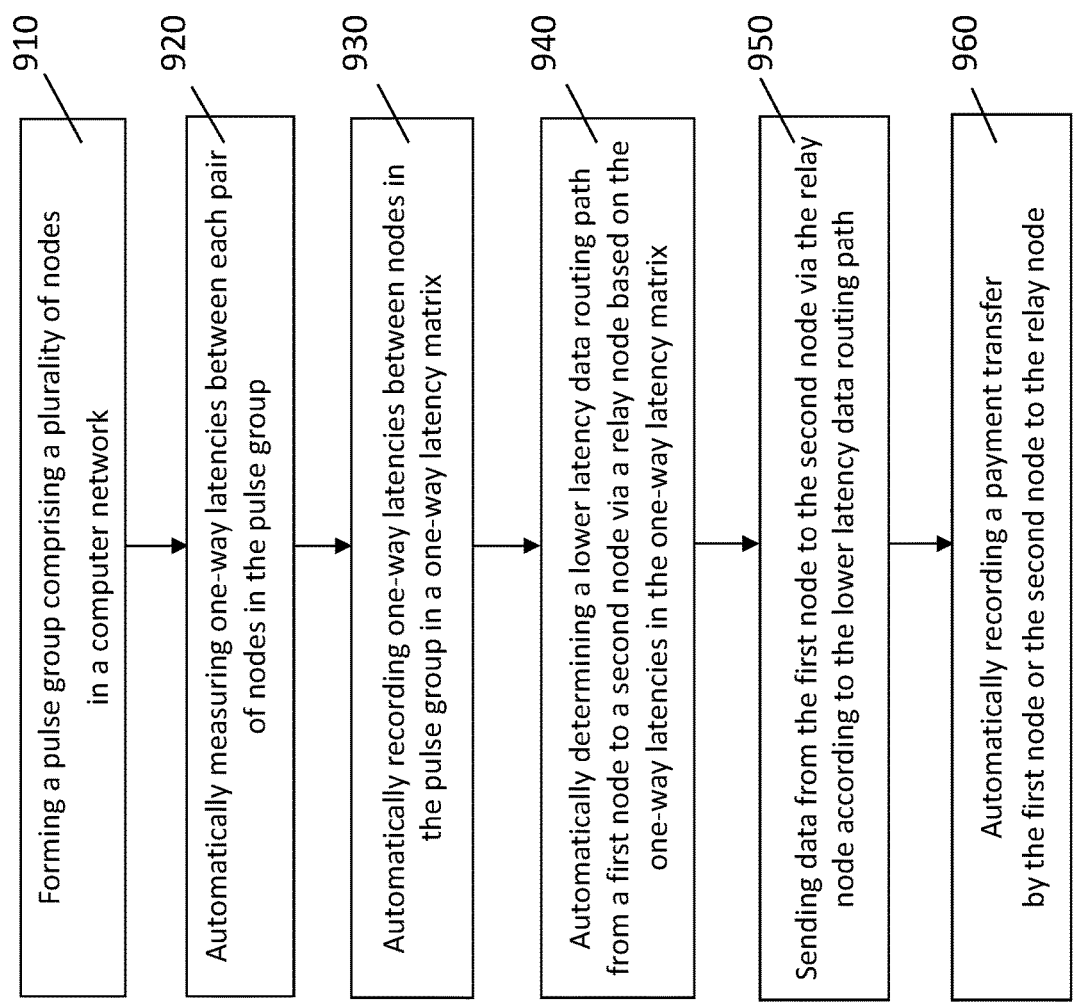
FIG. 9 is a flowchart for the formation of a pulse group, latency measurements and the selection of a better performing routing path in a pulse group, and the recordation of transactions for providing and using better performing data routes in accordance with some embodiments of the present invention.

In some embodiments, an exemplified implementation of the recordation and management system 760 is shown in FIG. 8. The recordation and management system 760 includes a repository management system 770 and validator nodes 771-774 (i.e. V-nodes). The repository management system 770 stores and manages historic data for the pulse groups: the roster of nodes in each pulse group, the one-way latency matrices recorded by different pulse groups, the available and selected routing paths, the performance characteristics (e.g. the amount of latencies reduced), and transactions made between nodes. The data is stored in a database in the repository management system 770.

The validator nodes 771-774 keep a distributed ledger to record the above described historic data including transactions between nodes in pulse groups. In general, the nodes in the pulse groups that serve as relay nodes for better data routing paths can considered as suppliers of distributed data routing resources. Those nodes that are in need of transmitting data can be considered as consumers of the distributed data routing resources. Additionally, the payment transfer between nodes in a pulse group does not need to involve direct data exchange between the two nodes. The two nodes can each own a digital wallet over the computer network or a Cloud. Payments can be made by one node to another by transfers (e.g. utility tokens) between their corresponding digital wallets.

Blockchain can be used to settle the transactions between the suppliers and the consumers of the collective resources of the distributed data routing in the pulse groups. The validator nodes 771-774 each includes computer memory installed with blockchain codes and a processor executed the blockchain codes such that the validator nodes 771-774 can collectively validate and publish transactions between nodes in the pulse groups. Payments between nodes in pulse groups can be made in different forms, for example, in utility tokens. Relay nodes of the better forming data routing paths can earn utility tokens from the nodes that will use or have used the better performing routing paths. Network data is continuously collected and stored by the distributed routing controller 750 in the form of a 'ticket' along with group statistics. The validator nodes 771-774 verify the network statistics that accompany the claim for reward, and add the transaction to the blockchain, which records the ledger of transfer of utility coins from the consumers to the suppliers for each use of alternative routing path selected as described above. The nodes A-E in the pulse group 710 can each have a digital wallet for storing utility tokens. Depending on their relative positions within data routing paths, each node can serve as a consumer or a supplier in a data routing event.

Moreover, referring to FIGS. 7 and 8, each node in the computer network 700 (FIG. 7) can simultaneously participate in multiple pulse groups and play the role of a consumer or a supplier in different pulse groups. Furthermore, a validator node 771-774 can also be a node (e.g. node A-node E) in a pulse group. In other words, a node in the computer network 700 can serve as a consumer or a supplier of resources of the distributed data routing as well as providing validating services for recording the transactions between the consumers and suppliers.

The validator nodes 771-774 can earn utility tokens for validating transactions under the rules of DARP as defined in the logics in the computer codes distributed among the validator nodes 771-774. These payments are receivable in the respective digital wallets of the validator nodes 771-774. For validating each transaction on the ledger, a validator node 771-774 can earn a small transaction fee, which is a small portion of the payment that a consumer pays for using a better-performing data route (most of payment goes to the supplier node(s) that provided the relay routing service). In addition, the validator nodes 771-774 can also earn dividend pool managed by the repository management system 770. The transaction revenues and dividends can ensure the stability and liquidity of the utility tokens, which in turn enable the availability and healthy usage of the distributed data routing resources in the disclosed distributed system and method.

The process of forming a pulse group, one-way latency measurements, the determination and selection of better performing data routing path, and the recording and payment transactions between nodes providing and using these routing paths can include one or more the following steps. Referring to FIG. 9 and FIGS. 7-8, with details described above (FIGS. 1A-1E, 5, and 6), a pulse group is formed by a plurality of nodes in a computer network (step 910). One-way latencies between each pair of nodes in the pulse group are automatically measured (step 920) continually (FIGS. 1A, 1B, 2A, 5, 6). One-way latencies are automatically recorded (FIGS. 1A-2A, 5, 6) between nodes in the pulse group in a one-way latency matrix (step 930). A lower latency data routing path from a first node to a second node via a relay node is automatically determined (FIGS. 1A-2A, 5, 6) based on the one-way latencies in the one-way latency matrix (step 940). According to the lower latency data routing path, data is sent from the first node to the second node via the relay node (step 950). A payment transfer from an entity (a digital wallet or an account) associated with the first node or the second node to an entity (a digital wallet or an account) associated with the relay node is automatically recorded (step 960) (FIGS. 7-8). As described in relation to FIG. 8 above, the payment transfer can be recorded on a ledger by a plurality of validator nodes using blockchain technologies.

Recent technology development by the inventors have demonstrated that pulse groups comprising a large number of nodes (e.g. 500 nodes) can successfully perform the above described tasks of pulse group formation, one-way latency calculations, recording of the one-way latencies in a matrix for a pulse group, and determinations of lower-latency data routing paths relayed by another node within the pulse group.

In some embodiments, methods and systems are provided to reduce overhead in OWL measurements within pulse groups comprising a large number of nodes. It should be noted that the number of OWL measurements required increase with the square function $n^2$ of the n integer number of nodes in the pulse group. For such large pulse groups, OWLs can be measured at time intervals longer than 1 sec while preferred lists of potential relay nodes are stored ready to be used for relaying data between nodes within a pulse group. In the presently disclosed approach, the selection of a lower OWL routing path does not require current measurements OWL values and determination of a better routing path based on the currently measured OWL values. Instead, a relay node will be selected from the preferred lists of potential relay nodes and a better relayed routing path is quickly identified for relayed data routing within the pulse group.

Figure 10:
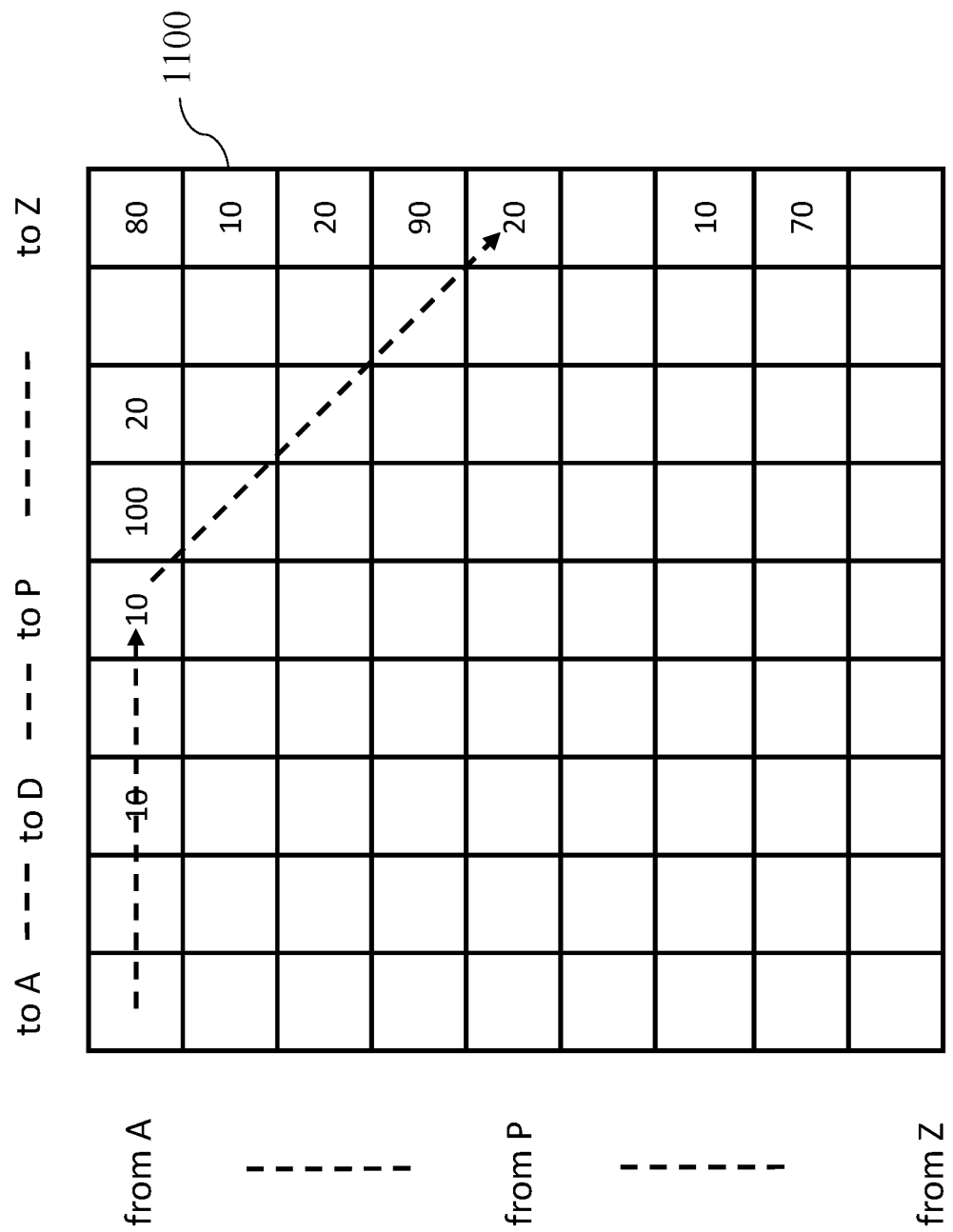
FIG. 10 shows is an exemplified one-way latency matrix and potential relay nodes for data routing associated with a large pulse group of distributed nodes in accordance with some embodiments of the present invention.
Figure 11:
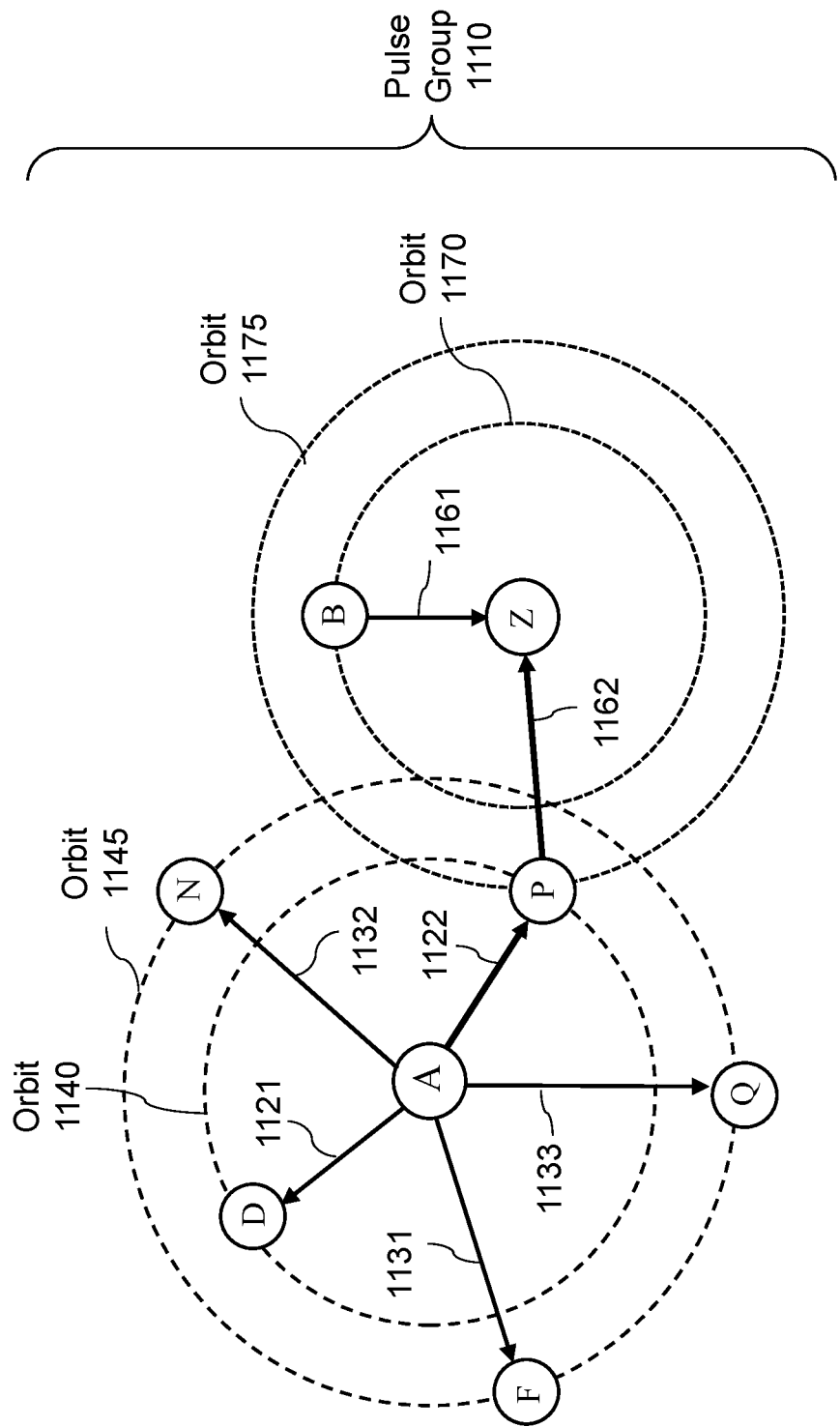
FIG. 11 illustrates pre-selected relay nodes for sending data and for receiving data in a large pulse group of distributed nodes in relation to FIG. 10.
Figure 12:
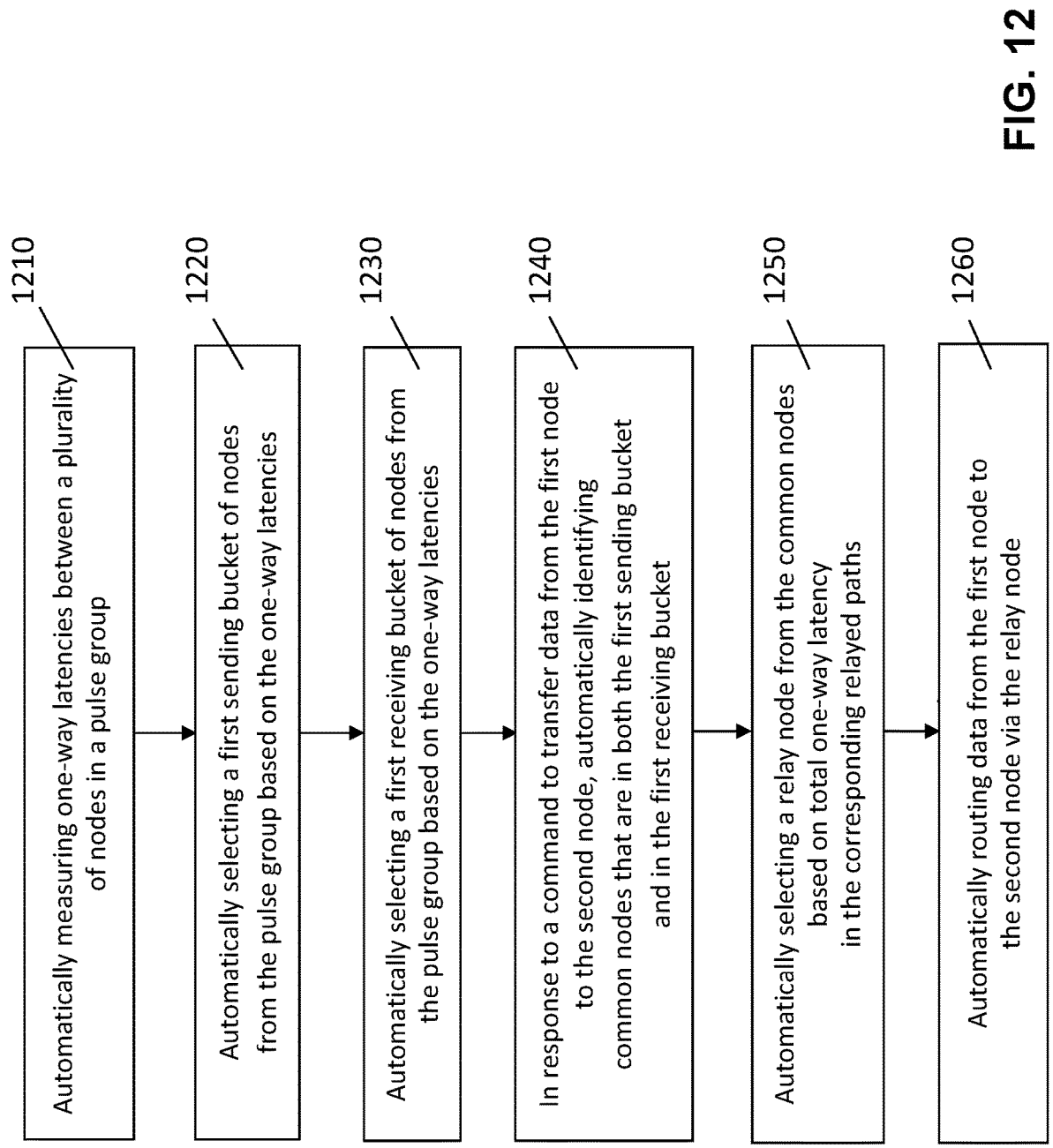
FIG. 12 is a flowchart for autonomously routing data using relay nodes pre-selected from a group of distributed computer nodes based on measured one-way latencies in accordance with some embodiments of the present invention.

Referring to FIGS. 10 and 11, an OWL matrix 1100 is obtained using the steps described above in relation to FIGS. 2A and 5. The OWL matrix 1100 includes one-way latency values measured from node A . . . node Z to node A . . . node Z. As described above, the OWL values are measured by pulse messages sent between nodes in a pulse group 1110. For example, node A sends pulse messages 1121, 1122, 1131, 1132, 1133 respectively to node D, node P, node F, node N, and node Q. Each pulse message is associated with a sending time stamp and a reception time stamp, from which an OWL value can be computed.

Conceptually, the nodes can be sorted in orbits 1140, 1145 based on their latencies from node A to other nodes in the pulse group 1110. Node D and node P can be in an orbit 1140, while node F, node N, and node are in orbit 1145. It should be noted that each node is associated with a set of outbound orbits for sending data from the node and a set of inbound orbits for receiving data by the node. For simplicity, the set of inbound orbits for node A is not shown in FIG. 11. Similarly, inbound orbits 1170, 1175 are also shown around node Z in the pulse group. For clarity, outbound orbits are not shown around node Z.

When there are no clock skews between nodes in the pulse, the OWL values in the OWL matrix 1100 represent true latencies. The orbit 1140 includes node D and node P which have approximately 10 ms latencies when receiving data (or pulse messages) from node A. The orbit 1145 includes node F, node N, and node Q which have similar but longer than 10 ms latencies when receiving data (or pulse messages) from node A.

In some embodiments, a preferred list (or a sending bucket) of relay nodes can pre-selected for forwarding data from a node (e.g. node A) to other nodes in the pulse group 1110 based on historic OWL data and determination of lower-latency paths based on the historic OWL data. For example, using the steps described in relation with FIGS. 2A and 5 above, the routing paths from node A to each of the other nodes (node B . . . node Z) in the pulse group 1110 can be evaluated using the OWL matrix 1100. Those relay nodes that consistently reduce latencies for forwarding data from node A are selected to form sending buckets as shown in orbits 1140, 1145. For example, node D and node P are selected in the forwarding bucket corresponding to orbit 1140.

Similarly, using the steps described in relation with FIGS. 2A and 5 above, the routing paths from other nodes (nodes A-Y) in the pulse group 1110 to node Z can be evaluated using the OWL matrix 1100. A set of receiving buckets corresponding to orbits 1170, 1175 (FIG. 11) can be obtained for routing data from other nodes A-Y in the pulse group 1110 to node Z. For example, node P is selected in the receiving bucket corresponding to orbit 1175, which has a OWL of 20 ms to node Z. Node B, with a OWL about 10 ms to Node Z, is selected in the receiving bucket corresponding to orbit 1170. Node P is a common node that is in both a sending bucket for node A and a receiving bucket for node Z. Node P thus can be a viable relay node for routing data from node A to node Z with a total latency time of 10 ms+20 ms=30 ms, as indicated in the OWL matrix 1100 in FIG. 10. For clarity reasons, receiving buckets for node A and sending buckets for node Z in the pulse group 1110 are not shown in FIG. 11.

A method for autonomously routing data using relay nodes pre-selected from a group of distributed computer nodes based on measured one-way latencies can include one or more of the following steps. The following described steps can be automatically executed by computer nodes (e.g. nodes 110-150 in FIG. 1 comprising a computer memory 115 and a processor 117) installed with the computer codes carrying DARP instructions as described in FIGS. 1A, 1B, 1D, 10, and 11.

A pulse group of nodes in a computer network such as the Internet is formed. As described above (FIGS. 1A-1B, 2A, 5), one-way latencies are automatically measured between a plurality of nodes in a pulse group (step 1210). The pulse group can include nodes A-E in FIG. 2A and nodes A-Z in FIG. 10. As described above, pulse messages are sent between each pair of nodes in both directions in the pulse group. The nodes in the pulse group include the initiation node, the destination, and the relay node in a data transfer described below, and the nodes in any sending bucket and any receiving bucket in the pulse group. One-way latencies are calculated using a first time stamp associated of sending time of the pulse message and a reception time of a pulse message. The results of the OWL values in the pulse group are recorded in a OLW matrix (e.g. 1100 in FIG. 10).

A first sending bucket of nodes from the pulse group are automatically selected based on the one-way latencies (step 1220). The nodes in the first sending bucket are candidates for relaying data from the first node. For example, FIG. 11 shows different sending buckets of nodes corresponding to orbits 1140, 1145 for sending data from node A. In FIG. 10, the nodes in the sending buckets correspond to and are selected from the nodes in the row "from A". Although the sending buckets for data sending from node A can be conceptually illustrated using orbits 1140, 1145 (with orbits being based on real latencies values while compensating for clock skews), nodes in the sending bucket of nodes are selected based on how much latency they can save in their relayed routing paths. As discussed above in relation to FIGS. 1A-1B, 2A, and 5, the total one-way latencies of relayed routing paths from the first node (e.g. node A) to other nodes in the pulse group relayed by potential relay nodes in the pulse group can be automatically calculated using the OWL matrix 1100. The potential relay nodes are selected and to place in the sending bucket (e.g. for node A) if the potential relay nodes provide lower total one-way latencies in the associated relayed routing paths than respective one-way latencies of direct paths from the first node to other nodes in the pulse group. The nodes in the "from A" row that have larger OWL values are not likely to be selected to be placed in a sending bucket because they are unlikely to produce a lower total latency if they were to relay data routing from node A to another node.

Similarly, a first receiving bucket of nodes are automatically selected from the pulse group based on the one-way latencies (step 1230). For example, FIG. 11 shows different sending buckets of nodes corresponding to orbits 1170, 1175 for node Z. In FIG. 10, the nodes in the receiving buckets correspond to and are selected from the nodes in the column "to Z". Although the receiving buckets for receiving data by node Z can be conceptually illustrated using orbits 1170, 1175, nodes in the receiving bucket of nodes are selected based on how much latency they can save in their relayed routing paths. As discussed above in relation to FIGS. 1A-1B, 2A, and 5, the total one-way latencies of relayed routing paths from other nodes to the second node (e.g. node Z) in the pulse group relayed by potential relay nodes in the pulse group can be automatically calculated using the OWL matrix 1100. The potential relay nodes are selected and to place in the receiving bucket (e.g. for node Z) if the potential relay nodes provide lower total one-way latencies in the associated relayed routing paths than respective one-way latencies of direct paths from other nodes to the second node in the pulse group. The nodes having larger OWL values in the "to Z" column are not likely to be selected to be placed in a receiving bucket because they are unlikely to produce a lower total latency if they were to relay data routing from another node in the pulse group 1110 to node Z.

It should be noted that even if computer clocks of the nodes in the pulse group may have skews relative to each other, the selections of nodes for the sending buckets and the receiving buckets are independent of the skews among the computer clocks at the plurality of nodes in the pulse group. The above described method of selecting nodes for the sending buckets and the receiving buckets automatically sort nodes based on their true latencies as illustrated by the orbits 1140, 1145, 1170, and 1175 as illustrated in FIG. 11. The nodes are selected nodes in the sending buckets and the receiving buckets because these nodes can relay data from an initiation node or to a destination node at low one-way latencies.

When a need arises for transferring data from the first node to the second node, in response to a command, the common nodes that are in both the first sending bucket and in the first receiving bucket are automatically searched and identified (1240). The total latency times of routing path from node A and to node Z relayed by the common nodes are compared. A relay node (e.g. node P) is automatically selected among these common nodes (step 1250) based on the total one-way latency of the relayed routing path. Typically, the relay node selected (e.g. node P) provides the lowest total one-way latency, among the common nodes, from the first node (e.g. node A) to the relay node (node P) and from the relay node to the second node (e.g. node Z).

It should be noted that the improved relay data routing path is determined in the current embodiment without relying on the current OWLs measurements in the pulse group. But rather, common nodes that are in both the sending buckets of the data initiation node and the receiving buckets of the data destination node are looked up. The relay node that provides the lowest overall latency is quickly selected. In a large pulse group (e.g. comprising 500 nodes), this simplified procedure can represent significant saving in overhead time. Moreover, only those relay nodes that demonstrate relatively stable network response times are selected in the sending or receiving buckets. OWL measurements in a pulse group can be much less frequent (e.g. a reduction by a factor of 5 or a factor of 10, etc.) comparing to the relayed data-routing methods described above.

After the relay node is selected, data can be automatically routed from the first node (e.g. node A) to the second node (e.g. node Z) via the relay node (e.g. node Z) (step 1260). Given how the nodes (and thus the common nodes or the relay node) are selected in steps 1220 and 1230, the total one-way latency of the data routing path relayed by the relay node usually will be lower than the OWL value for the direct path from the first node (e.g. node A) to the second node (e.g. node Z).

In some embodiments, OWL values between nodes in a pulse group may change, fluctuate, or drift over time. Nodes that are unstable are either unsuitable in a pulse group (step 1025 in FIG. 1C), or not qualified to be relay nodes because they may not reliably relay lower latency data path. However, the drifting and variations in OWL values in a pulse group can still render some nodes in the sending buckets or the receiving buckets less desirable and other previously unselected nodes more suitable for acting as relay nodes. In the present embodiment, the OWL values can be measured at longer time intervals. The lower one-way latency data routing paths and associated relay nodes are re-confirmed at these time intervals. If some nodes can relay data sent from node A at lower latencies than the nodes already in the sending bucket for node A, these nodes are updated in the sending bucket for node A. Some nodes with less performance may be removed from the sending bucket. Similarly, the receiving buckets for node Z can also be update by adding or removing nodes based on the respective total OWL values in their relayed paths.

Utility and Governance for Distributed Data Routing Over the Internet

The proper operations of distributed autonomous routing protocol (DARP) require relay nodes to meet certain performance criteria such as uptime and bandwidths so that they are capable of reliably relaying data between other nodes. Additionally, relay nodes and all other nodes need to be governed and incentivized to bandwidth sharing and other operations to be performed properly. The uptime and bandwidths of the relay nodes and the completion of data routing will also need to be validated and recorded by validator nodes (V-nodes described in relation to FIGS. 7-9 above).

In some embodiments, the computer system and operation steps for DARP described in FIGS. 1-12 are managed by a utility system and a governance system. Such examples include the technical qualifications of the relay nodes and other nodes, and the incentives for performing various utility and governance tasks in the presently disclosed DARP system and methods. Other details about the utility system and the governance system are disclosed by the commonly assigned U.S. provisional patent application 63/179,230 titled "System, Method, and Tokenomics for Distributed Data Routing over the Internet", filed Apr. 24, 2021, the content of which is incorporated herein by reference.

Figure 13:
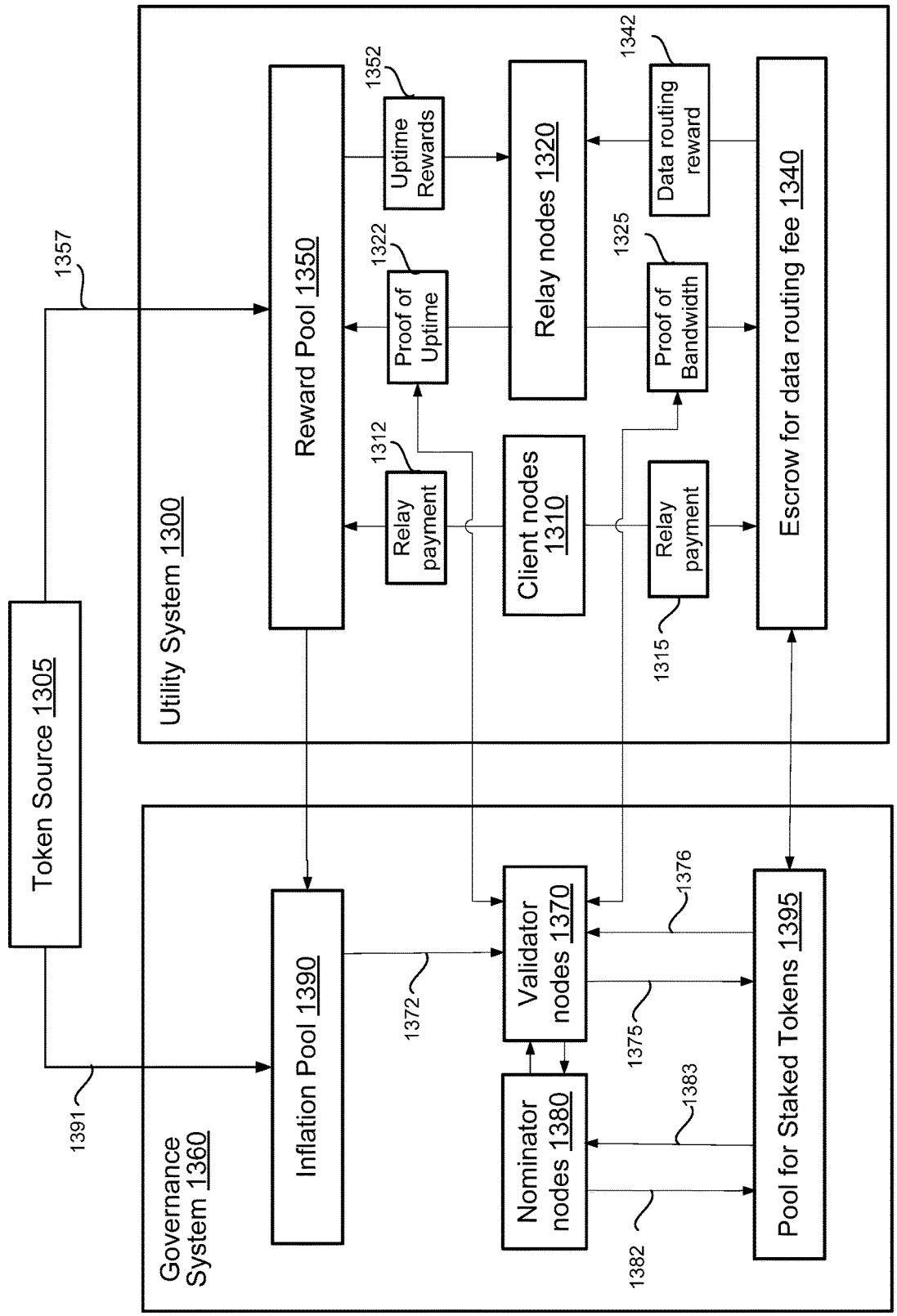
FIG. 13 is a system diagram for a utility system and a governance system for autonomously routing data using.

Referring to FIG. 13, a utility system 1300 manages the proper functions of the various nodes, modules and systems under DARP to assure the tasks of lower-latency data routing to be reliably performed in the distributed system. A governance system 1360 manages governance functions of the DARP community to ensure fulfillment of tasks as defined under DARP and agreed upon (e.g. under smart contracts), and to prevent frauds and minimize security risks.

A token source 1305 supplies cryptographic tokens as financial credits to award proper incentives to entities that have performed their pre-agreed tasks under DARP. In the presently disclosed DARP computer network and process, tokens can be used for user utility and network utility; a token represents a unit of value derived from data relay on the Internet and its intrinsic value within the DARP ecosystem. The cryptographic tokens can reside on a blockchain. Examples of user utility include transaction fee for network configuration and other computationally demanding tasks, payments credits to bandwidth suppliers (i.e. relay nodes) with tokens from bandwidth users (i.e. client nodes). Examples of network utility include governance of the network through Nominated Proof-of-Stake (NPoS) consensus protocol, network security through financial staking, and support measure for network growth.

In general, the utility system 1300 (also referred as the utility layer) ensures and maintains conditions for network-routing performance and enables exchanges of utility tokens for using the network services. Client nodes are provided with easy-to-use decentralized service for creating and managing networks as well as routing their data securely and in an optimized way. Relay nodes are fairly rewarded for this work. The utility system 1300 provides payment fees for all blockchain transactions. Validators earn a small commission for their work on all blockchain transactions. Transactions related to DARP, such as nodes, routes, and path configurations, allow nodes to securely connect to the DARP network and use it for bandwidth exchange. The utility system 1300 also supports the growth of DARP network infrastructure. The software defined distributed network is built on a backbone of servers. A fixed remuneration incentive can fosters easier adoption of the DARP network. Relay nodes that cannot earn significant returns from data routing are still getting rewards for their uptime (i.e. participation and readiness to perform routing). This should cover server maintenance costs and keep them connected to the network, thus, effectively lowering the barriers of entry into the DARP network for any server and making it stable at the same time.

The utility system 1300 includes client nodes 1310 that request data routing services and relay nodes 1320 that relay data for the client nodes 1310 to their respective intended destination nodes. The client nodes 1310 have also been referred above as the initiation node in data routing or the first node that initiated the data routing request. For a node to perform relaying data between other nodes, the node needs to meet certain capability and behavioral requirements such as bandwidth and uptime. The demonstration of technical qualities and the completion of data routing tasks are rewarded by an escrow 1340 for data routing fees and a reward pool 1350 for assuring continuous operational conditions of the relay nodes. The reward pool 1350 is infused with a fund 1357 from the token source 1305. For example, a set percentage of the total token supply in the DARP community can be allocated to the reward pool 1350 to enable incentivized operations.

In general, the governance system 1360 (also referred as the governance layer) governs the DARP economy through Nominated Proof-of-Stake consensus. An inflationary supply model stabilizes the governance system by increasing or decreasing the inflation level based on the stake rate of circulating supply. Nodes are willing to stake in order to get a stable yield. The governance system 1360 also secures the DARP economy by staking. At the same time, staking ensures the security of the blockchain as stakes are slashed for malicious behavior. With staking yield, all participants are incentivized to perform to the best of their efforts.

The governance system 1360 includes validator nodes 1370 (also described in relation to FIGS. 7-9 above), nominator nodes 1380, an inflation pool 1390, and a pool 1395 for staked tokens. The inflation pool 1390 receives an initial injection of tokens 1391 from the token source 1305 and can continually receives tokens at regular time intervals to produce inflation (e.g. an annual inflation of 5%).

Before a node is approved to perform the role of a relay node, the node needs to provide proof for its uptime and bandwidth. In addition, a relay node can also be required to satisfy minimum hardware properties (e.g. CPU speed, memory size, etc.), staking of tokens (that aligns the node's interest with the DARP community), and responsiveness to communications and data-routing requests (milliseconds that the node takes for a response). After approval, the relay node needs to continue to provide proof of uptime and proof of bandwidth to assure that enough number of relay nodes is ready at any given time to provide data routing services. The queries (e.g. CPU specification), testing (e.g. data transfer bandwidth), and recording (e.g. node uptime and responsiveness) of above information are automatically performed based on the DARP computer codes installed in the nodes.

A relay node 1320 produces a first signal 1322 containing a proof of uptime, that is, the percentage of time that the node is up in operation and responsive to requests from other members of the DARP community. The proof of uptime in the first signal 1322 is validated by a validator node 1370. The validated proof of up time is received by the reward pool 1350. An uptime reward 1322 is issued from the reward pool 1350 to the relay node 1320 for its operational readiness. The uptime reward 1352 is paid in the form of tokens initially provided to the reward pool 1350 by the token source 1305, which are subsequently distributed to various entities in the DARP community.

Similarly, the relay node 1320 produces a second signal 1325 containing a proof of bandwidth, that is, the measured data-transfer bandwidths to and from the relay node. The measurements are defined by standard tests as defined in the DARP computer codes installed on the relay node (which is similar to the Internet speed test on a home computer for data downloading and uploading). The proof of bandwidth in the second signal 1325 is also validated by a validator node 1370. The validated proof of bandwidth is received by the escrow 1340 and the relay node 1320 can be awarded accordingly. The proof of bandwidth assures that a relay node has the bandwidth capacity to relay data from a client node (i.e. initiation node) to a destination node.

The validator nodes 1370 are rewarded for validating the proof of uptime and the proof of bandwidth. The inflation pool 1390 can send award 1372 to the validator node 1370 for validating proof of uptime of a relay node. Part of the award payment can be transferred from the reward pool 1350 generated from operation income (e.g. data relay fees paid by the client nodes 1310 as discussed below). The pool 1395 for staked tokens can also award the validator for validating proof of bandwidth of a relay node. Part of the award payment can be transferred from the escrow 1340 for data routing fees generated from operation income (data relay fees paid by the client nodes 1310 after completion of a data routing operation as discussed below).

Moreover, the award 1372 can also be sent to validator nodes 1370 for their continued participating in validations and operation readiness (e.g. uptime and responsiveness, as the amount of data exchange required for validation is typically small).

After each data relay by a relay node, the completion of the data-relay task is validated and associated token transactions are recorded by a validator 1370. As described in connection with FIGS. 7-10 above, the transactions can be recorded by a validator 1370 in blocks on a blockchain. Additionally, the validator 1370 can be tasked to collect the transaction fees. After the validation, the client node 130 sends a first relay payment 1315 to the escrow 1340 as a contribution data routing fee to award relay nodes. The client node 130 can also send a second relay payment 1312 to the reward pool 1350 as a contribution to ensure continued operational readiness by the relay nodes 1320 and other entities in the DARP community. The relay node is credited with a data routing reward 1342 by the escrow 1340. The validators 1370 are awarded for performing computational validation on the network and for producing blocks of the transaction and validation on a blockchain.

The validator nodes 1370 can be encouraged to stake some of their own tokens 1375 in the pool 1395, which in return can pay off an annual interest payment 1376 to the validator nodes 1370. The staking of validator nodes 1370 ensures high communication responsiveness, and builds a long-term reputation of reliability for validation functions, which is essential in recording data routing and verifying status and performances of critical entities in the DARP community.

In some embodiments, a nomination mechanism is provided in the governance system 1360 to ensure extra layer of security and fraud prevention. Each validator node 1370 can be nominated by a plurality of nominator nodes 1380 in the DARP community. The nominator nodes 1380 can also be encouraged to stake some of their own tokens 1382 in the pool 1395. The nomination requires staking of tokens by the nominator node to be bound for the nominated validator node. The validator nodes 1370 can earn interest rate on the tokens bounded to it by the nominator nodes 1380 and can share a part of these rewards with their nominator nodes 1380. The most nominated nodes are selected to perform validations for the DARP community. The vetting and staking by the nominator nodes and associated incomes by both the nominator nodes and the validator nodes 1370 ensures trusts in the validator nodes for performing their tasks and removes incentives for cheating.

Staking can also be a reversible process: the pool 1395 can also return some or all the stakes 1376, 1383 respectively to the validator nodes 1370 and the nominator nodes 1380. In those events, such validator nodes 1370 and nominator nodes 1380 may lose their qualifications for their respective roles for validation and nomination.

The disclosed systems can include reward mechanisms for other tasks necessary for distributed autonomous data routing. For example, a payment can be made for setting up of a fully functional node in compliance with DARP. In another example, a payment can be made for identifying and configuring a feasible relayed data routing path from a first node (a client node 1310) to a second node (a potential destination node) via a relay node based on the one-way latencies between the plurality of nodes. In another example, path configuration fee is charged once the path is agreed upon and configured for routing. A client node can purchase the data routing service by bidding a specific amount of tokens per standard data unit (e.g. Gigabyte) and also indicating the amount of data units it wants to be able to route through the DARP network. Conversely, Relay nodes can ask for certain data routing prices that are economically feasible for them to perform as routers.

In some embodiments, the utility system 1300 can include a permanent sink to remove tokens from the circulation. A fixed percentage of the rewards collected into the reward pool 1350 can be burned. Burning would reduce the token supply created with inflation and bring down the circulating supply to a stable level, supported by demand within the DARP bandwidth sharing community.

Figure 14:
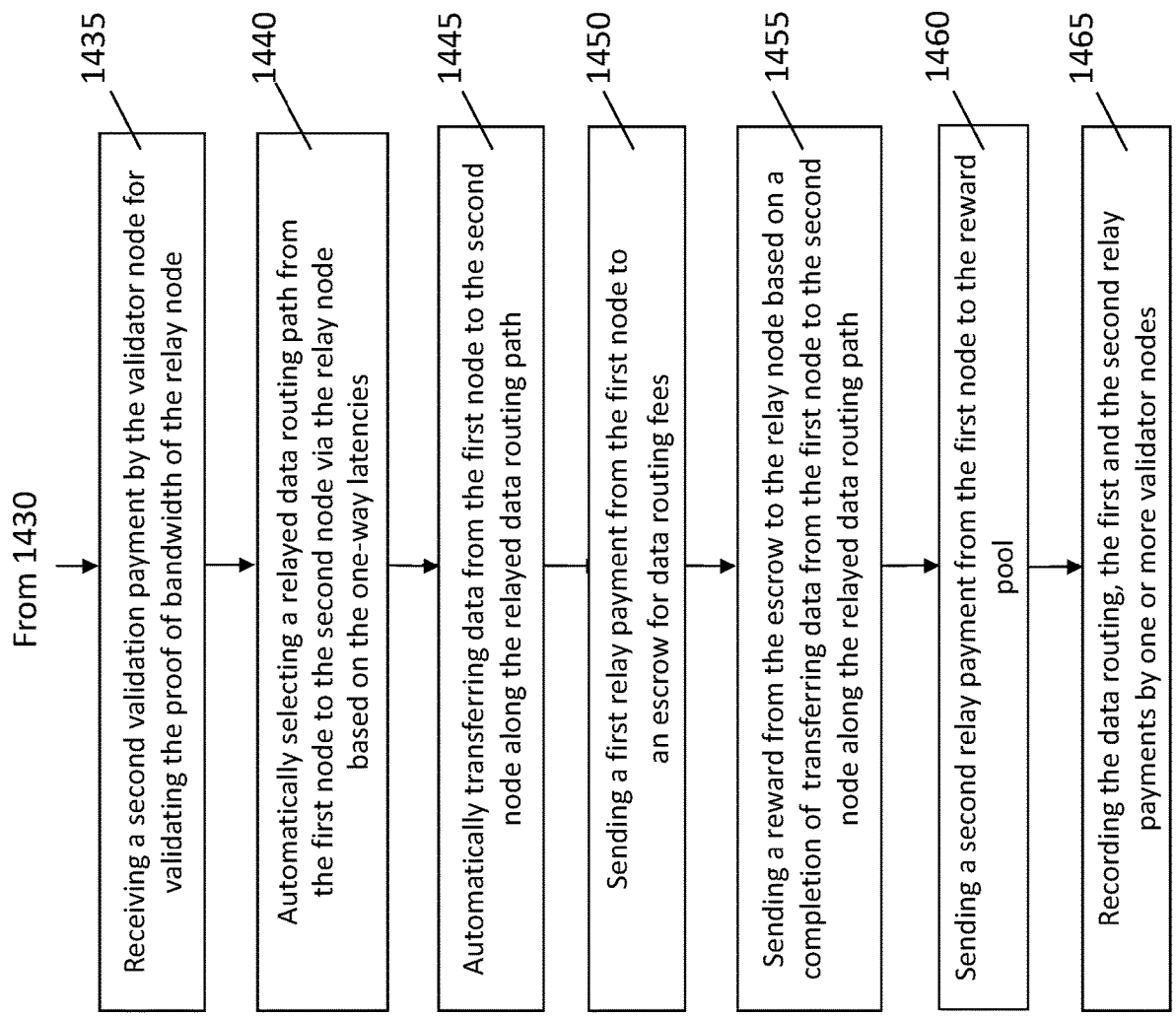
FIG. 14 a flowchart of autonomously routing data in the utility system and the governance system of FIG. 13.
Figure 14:
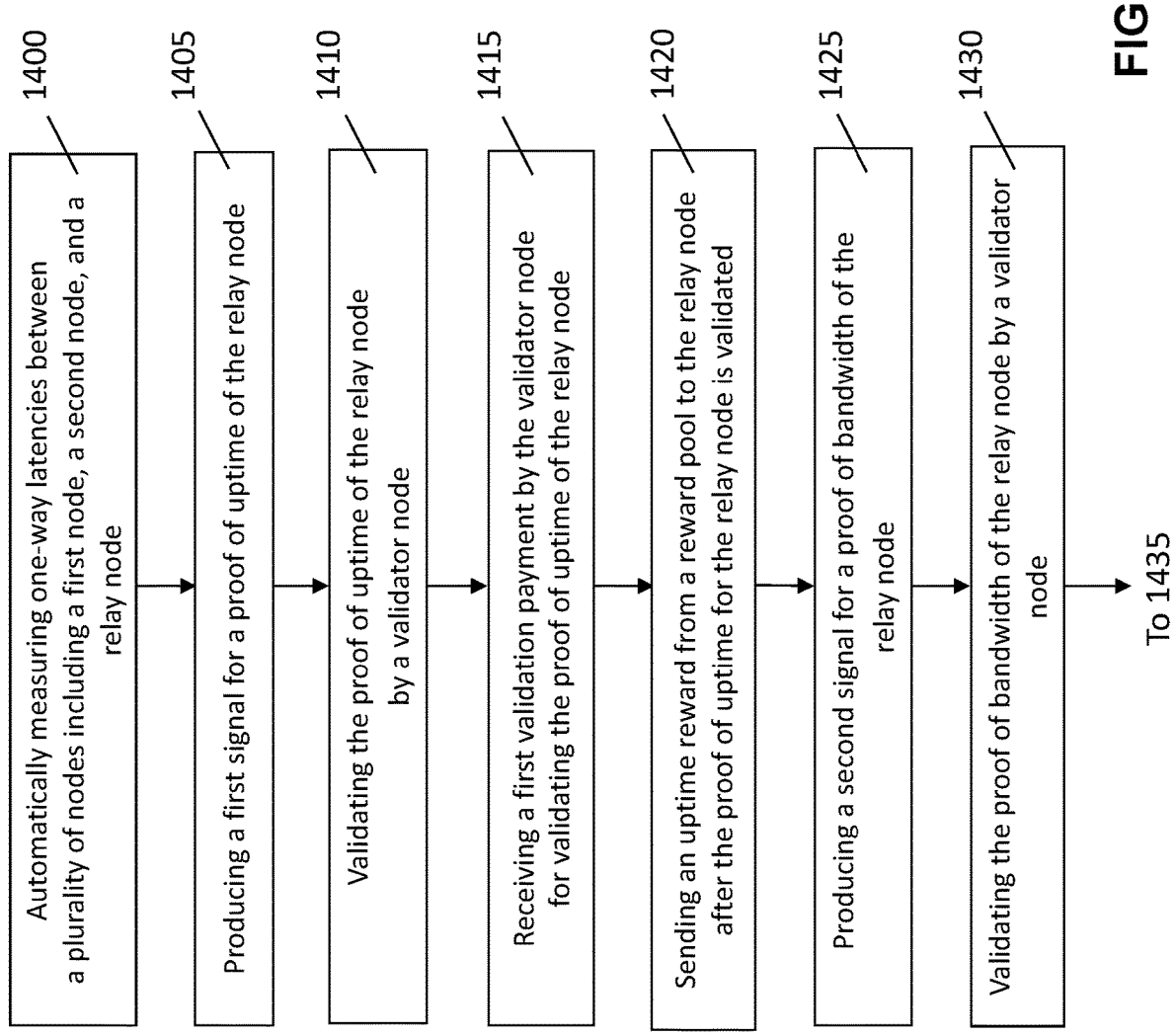

In some embodiments, operation steps of the utility system and the governance system for DARP are now discussed. Referring to FIG. 14, one-way latencies are automatically measured between a plurality of nodes including a first node, a second node, and a relay node (step 1400). Details about one-way latency measurements between nodes are described above in relation to FIGS. 1A-12 using the example of a pulse group formed by a plurality of nodes. It should be noted, however, that one-way latency measurements and associated selection of relayed data routing paths under DARP are not limited to pulse groups. In general, DARP allows nodes to connect into a secure, encrypted, and automatically optimized virtual mesh network which acts as an alternative connectivity layer. It is an upgrade to the conventional computer networks (e.g. the Internet), making the transition from physical to virtual network operation and governance. DARP provides trustless encrypted connectivity and performance services for the vast majority of use cases and applications. The plurality of nodes can be inter-related in many different forms such as a pulse group, a peer-to-peer tree network branched off from a client node, etc.

To perform the role of a relay node, as described above with FIG. 13, the relay node needs to continually or regularly demonstrate that it meets the performance requirements. The relay node (as well as other nodes in the polarity of nodes) are pre-stalled the DARP computer codes. Under the instructions of DARP, the relay node produces a first signal for a proof of uptime of the relay node (step 1405). The proof of uptime of the relay node is validated by a validator node (step 1410). A first validation payment is received by the validator node for validating the proof of uptime of the relay node (step 1415). Moreover, after the proof of uptime for the relay node is validated, an uptime reward is sent from a reward pool to the relay node (step 1420) reward the relay node to be operational ready to respond to requests from other nodes.

Furthermore, under instructions of DARP, the relay node produces a second signal for a proof of bandwidth of the relay node (step 1425). The proof of bandwidth of the relay node is validated by a validator node (step 1430). A second validation payment is received by the validator node for validating the proof of bandwidth of the relay node (step 1435).

Aside from uptime and bandwidth, the relay node may need to satisfy other requirements such as minimum hardware properties, staking of tokens, and responsiveness to communications and data-routing requests as described above.

Once a relay node satisfies all the requirements, the relay node is available to relaying data between other nodes in the plurality of nodes. For example, in response to a request by the first node (the client node or the initiation node in data routing) to send data to a second node (the destination node in data routing), a relayed data routing path from the first node to the second node via the relay node is automatically identified based on the one-way latencies (step 1440).

In some embodiments, the selection of the relayed data routing path can be based on the health of the each routing segment along the relayed routing path. In general, DARP removes third-party security risk that can arise from the use of a certificate or a cloud service provider. DARP establishes user-owned security instead, as all communication is endto-end encrypted using WireGuard technology. Only the end-points themselves can decrypt their messages. A relayed data routing path can include multiple routing segments. For example, the relayed data routing path from the first node to the second node includes a first routing segment from the first node to the relay node, and a second routing segment. A routing segment is a bidirectional WireGuard connection. A relayed data routing path can be evaluated by the following metrics:

one-way latency for each routing segment as a primary metric;

an uptime of each of the nodes forming the relayed data routing path;

a median jitter of each routing segment in the relayed data routing path;

a median bandwidth of each routing segment in the relayed data routing path;

an average packet-loss of each routing segment in the relayed data routing path; and amount of data routed in both directions by each routing segment in the relayed data routing path.

The above factors can be expressed in a math formula (with weighting coefficients for each factor) to quantitatively represent a health-score for each relayed data routing path, which can be used to evaluate and select the relayed path (step 1440).

As described above in relation to FIG. 2A, 5, 9, 12, the identified relayed data path has a lower one-way latency than the direct path from the first node to the second node. Subsequently, data is automatically transferring from the first node to the second node along the relayed data routing path (step 1445).

A first relay payment is sent from the first node (the client node) to an escrow to partially pay for data routing fees (step 1450). A reward is sent from the escrow to the relay node based on the completion of data transfer from the first node to the second node along the relayed data routing path (step 1455) as a reward to the data relay service provided by the relay node. A second relay payment is sent from the first node to a reward pool (step 1460). This smaller second relay payment contributes to the fund for the DARP community (e.g. the utility system 1300) to maintain and reward the operational readiness by the relay nodes and other upkeep tasks.

The first relay payment, the second relay payment, and information about the relayed data routing can be automatically recorded by the one or more validator nodes (step 1465). Similarly, proof of uptime and proof of bandwidth for a relay node can also be recorded. As described above in FIG. 8, the above information can be recorded in successively interconnected blocks in a blockchain.

Other details about the operation steps of the utility system and the governance system for DARP are disclosed by the commonly assigned U.S. provisional patent application 63/179,230 titled "System, Method, and Tokenomics for Distributed Data Routing over the Internet", filed Apr. 24, 2021, the content of which is incorporated herein by reference.

The above embodiments are only used to illustrate the technical solution of the present invention but not to limit it. Those skilled in the art can modify or equivalently replace the technical solution of the present invention without departing from the spirit and scope of the present invention. The scope of protection shall be subject to the claims.

What is claimed is:

1. A method for distributed routing data using relay nodes, comprising:

automatically measuring one-way latencies between a plurality of nodes comprising a first node, a second node, and a relay node;

producing a first signal associated with a proof of uptime for the relay node;

producing a second signal associated with a proof of bandwidth for the relay node;

after the proof of uptime and the proof of bandwidth of the relay node are validated, automatically identifying a relayed data routing path from the first node to the second node via the relay node based on the one-way latencies between the plurality of nodes, in response to a command to transfer data from the first node to the second node;

transferring data from the first node to the second node along the relayed data routing path;

sending a first relay payment from the first node to a reward pool; and sending an uptime reward from the reward pool to the relay node if the proof of uptime for the relay node is validated.

2. The method of claim 1, further comprising:

sending a second relay payment from the first node to an escrow for data routing fees; and sending a reward from the escrow to the relay node based on a completion of transferring data from the first node to the second node along the relayed data routing path.

3. The method of claim 1, further comprising:

validating the proof of uptime of the relay node by one or more validator nodes.

4. The method of claim 3, further comprising:

receiving a first validation payment by the one or more validator nodes for validating the proof of uptime of the relay node.

5. The method of claim 1, further comprising:

validating the proof of bandwidth of the relay node by one or more validator nodes.

6. The method of claim 5, further comprising:

receiving a second validation payment by the one or more validator nodes for validating the proof of bandwidth of the relay node.

7. The method of claim 1, wherein automatically identifying a relayed data routing path is based on a total one-way latency of the relayed data routing path and at least one of criteria that include:

an uptime of each of the nodes forming the relayed data routing path;

a median jitter of each routing segment in the relayed data routing path;

a median bandwidth of each routing segment in the relayed data routing path;

an average packet-loss of each routing segment in the relayed data routing path; or amount of data routed in both directions by each routing segment in the relayed data routing path.

8. The method of claim 1, wherein a total one-way latency of the relayed path is lower than a one-way latency associated with a direct path from the first node to the second node.

9. The method of claim 1, wherein step of automatically measuring one-way latencies between a plurality of nodes comprises:

automatically sending a plurality of pulse messages from the first node to other nodes in the plurality of node;

receiving one of the plurality of pulse messages by the relay node, wherein the one of the plurality of pulse messages includes a first timestamp associated with sending time by the first node, wherein the one of the plurality of pulse messages is received at a reception time associated with a second time stamp; and automatically computing a first one-way latency from the first node to the relay node based on the first time stamp and the second time stamp.

10. The method of claim 9, wherein step of automatically measuring one-way latencies between a plurality of nodes comprises:

automatically sending a plurality of pulse messages from nodes to the second node;

receiving one of the plurality of pulse messages from the relay node by the second node, wherein the one of the plurality of pulse messages includes a third timestamp associated with sending time by the relay node, wherein the one of the plurality of pulse messages is received at a reception time associated with a fourth time stamp; and automatically computing a second one-way latency from the relay node to the second node based on the third time stamp and the fourth time stamp, wherein a total one-way latency for the relayed data routing path is characterized by a sum of the first one-way latency and the second one-way latency.

11. The method of claim 10, wherein the total one-way latency is smaller than a one-way latency measured in a direct path from the first node to the second node.

12. A non-transitory computer-readable medium storing a plurality of instructions which, when executed by one or more processors, cause the one or more processors to perform operations a computer network, the operations comprising:

automatically measuring one-way latencies between a plurality of nodes comprising a first node, a second node, and a relay node;

producing a first signal associated with a proof of uptime for the relay node;

producing a second signal associated with a proof of bandwidth for the relay node;

after the proof of uptime and the proof of bandwidth of the relay node are validated, automatically identifying a relayed data routing path from the first node to the second node via the relay node based on the one-way latencies between the plurality of nodes, in response to a command to transfer data from the first node to the second node;

transferring data from the first node to the second node along the relayed data routing path;

sending a first relay payment from the first node to a reward pool; and sending an uptime reward from the reward pool to the relay node if the proof of uptime for the relay node is validated.

13. The non-transitory computer-readable medium of claim 12, wherein the operations further comprise:

sending a second relay payment from the first node to an escrow for data routing fees;

sending a reward from the escrow to the relay node based on a completion of transferring data from the first node to the second node along the relayed data routing path.

14. The non-transitory computer-readable medium of claim 12, wherein step of automatically identifying a relayed data routing path is based on a total one-way latency of the relayed data routing path and at least one of criteria that include:

an uptime of each of the nodes forming the relayed data routing path;

a median jitter of each routing segment in the relayed data routing path;

a median bandwidth of each routing segment in the relayed data routing path;

an average packet-loss of each routing segment in the relayed data routing path; or amount of data routed in both directions by each routing segment in the relayed data routing path.

15. The non-transitory computer-readable medium of claim 12, wherein step of automatically measuring one-way latencies between a plurality of nodes comprises:

automatically sending a plurality of pulse messages from the first node to other nodes in the plurality of node;

receiving one of the plurality of pulse messages by the relay node, wherein the one of the plurality of pulse messages includes a first timestamp associated with sending time by the first node, wherein the one of the plurality of pulse messages is received at a reception time associated with a second time stamp; and automatically computing a first one-way latency from the first node to the relay node based on the first time stamp and the second time stamp.

16. A computer system for autonomously selecting low-latency data routing paths across the Internet, comprising:

a server configured to send instructions to a plurality of nodes in a computer network; and a memory storing the instructions that, when executed by one or more processors at the plurality of nodes, cause the plurality of nodes to:

automatically measure one-way latencies between a plurality of nodes comprising a first node, a second node, and a relay node;

produce a first signal associated with a proof of uptime for the relay node;

producing a second signal associated with a proof of bandwidth for the relay node;

after the proof of uptime and the proof of bandwidth of the relay node are validated, automatically identify a relayed data routing path from the first node to the second node via the relay node based on the one-way latencies between the plurality of nodes, in response to a command to transfer data from the first node to the second node;

transfer data from the first node to the second node along the relayed data routing path;

send a first relay payment from the first node to a reward pool; and send an uptime reward from the reward pool to the relay node if the proof of uptime for the relay node is validated.

17. The computer system of claim 16, wherein the instructions that, when executed by the one or more processors at the plurality of nodes, further cause the plurality of nodes to send a second relay payment from the first node to an escrow for data routing fees;

send a reward from the escrow to the relay node based on a completion of transferring data from the first node to the second node along the relayed data routing path.

18. The computer system of claim 16, wherein the instructions that, when executed by the one or more processors at the plurality of nodes, further cause the plurality of nodes to automatically identify a relayed data routing path based on a total one-way latency of the relayed data routing path and at least one of criteria that include:

an uptime of each of the nodes forming the relayed data routing path;

a median jitter of each routing segment in the relayed data routing path;

a median bandwidth of each routing segment in the relayed data routing path;

an average packet-loss of each routing segment in the relayed data routing path; or amount of data routed in both directions by each routing segment in the relayed data routing path.

19. The computer system of claim 16, wherein the instructions that, when executed by the one or more processors at the plurality of nodes, further cause the plurality of nodes to automatically send a plurality of pulse messages from the first node to other nodes in the plurality of node;

receive one of the plurality of pulse messages by the relay node, wherein the one of the plurality of pulse messages includes a first timestamp associated with sending time by the first node, wherein the one of the plurality of pulse messages is received at a reception time associated with a second time stamp; and automatically compute a first one-way latency from the first node to the relay node based on the first time stamp and the second time stamp.

\* \* \* \* \*